(12) United States Patent
Dinan

(10) Patent No.: US 11,736,222 B2
(45) Date of Patent: Aug. 22, 2023

(54) DOWNLINK CONTROL INFORMATION FIELDS FOR A LICENSED CELL AND AN UNLICENSED CELL IN A WIRELESS NETWORK

(71) Applicant: Samsung Electronics Co., Ltd., Suwon-si (KR)

(72) Inventor: Esmael Hejazi Dinan, McLean, VA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 31 days.

(21) Appl. No.: 17/538,325

(22) Filed: Nov. 30, 2021

(65) Prior Publication Data

US 2022/0094461 A1    Mar. 24, 2022

Related U.S. Application Data

(63) Continuation of application No. 16/783,033, filed on Feb. 5, 2020, now Pat. No. 11,190,297, which is a
(Continued)

(51) Int. Cl.
| | |
|---|---|
| *H04W 4/00* | (2018.01) |
| *H04L 1/00* | (2006.01) |
| *H04L 5/00* | (2006.01) |
| *H04L 27/00* | (2006.01) |
| *H04L 1/1822* | (2023.01) |

(Continued)

(52) U.S. Cl.
CPC ............ *H04L 1/001* (2013.01); *H04L 1/1822* (2013.01); *H04L 5/0091* (2013.01); *H04L 27/0006* (2013.01); *H04W 72/23* (2023.01); *H04L 1/0025* (2013.01); *H04L 1/1819* (2013.01)

(58) Field of Classification Search
CPC ...... H04L 1/001; H04L 1/0025; H04L 1/1819
See application file for complete search history.

(56) References Cited

U.S. PATENT DOCUMENTS

| 9,674,866 B2 | 6/2017 | Li et al. |
| 2011/0222485 A1 | 9/2011 | Nangia et al. |
| (Continued) | | |

OTHER PUBLICATIONS

U.S. Non-final Office Action dated Dec. 29, 2021, issued in U.S. Appl. No. 17/034,974.
(Continued)

*Primary Examiner* — Bo Hui A Zhu
(74) *Attorney, Agent, or Firm* — Jefferson IP Law, LLP

(57) ABSTRACT

A wireless device receives a first downlink control information. The first downlink control information comprises a first field having a first number of bits indicating: a first modulation and coding scheme (MCS); and a first redundancy version (RV). A first transport block is transmitted via a licensed cell based on the first MCS and the first RV. A second downlink control information is received. The second downlink control information comprises: an MCS field having the first number of bits indicating a second MCS; an RV field indicating a second RV; and a transmit power control field for determining a transmit power. A second transport block, based on the second MCS, the second RV, and the transmit power, is transmitted via a physical uplink shared channel of an unlicensed cell.

16 Claims, 24 Drawing Sheets

Related U.S. Application Data continuation of application No. 15/421,991, filed on Feb. 1, 2017, now Pat. No. 10,567,110.

(60) Provisional application No. 62/313,009, filed on Mar. 24, 2016, provisional application No. 62/309,885, filed on Mar. 17, 2016.

(51) Int. Cl.
*H04W 72/23* (2023.01)
*H04L 1/1812* (2023.01)

(56) References Cited

U.S. PATENT DOCUMENTS

| | | |
|---|---|---|
| 2014/0011468 A1 | 1/2014 | Park et al. |
| 2014/0056184 A1 | 2/2014 | Yang et al. |
| 2014/0362780 A1* | 12/2014 | Malladi ............... H04L 27/0006 370/329 |
| 2015/0055541 A1 | 2/2015 | Zhang et al. |
| 2015/0341921 A1 | 11/2015 | Chen et al. |
| 2016/0029239 A1 | 1/2016 | Sadeghi et al. |
| 2016/0065332 A1 | 3/2016 | Yum et al. |
| 2016/0095114 A1 | 3/2016 | Kim et al. |
| 2016/0112992 A1 | 4/2016 | Bhushan et al. |
| 2016/0113004 A1 | 4/2016 | Yu et al. |
| 2016/0295345 A1 | 10/2016 | Oh |
| 2016/0366689 A1 | 12/2016 | Zhang et al. |
| 2017/0195888 A1* | 7/2017 | Gou ..................... H04L 5/005 |
| 2017/0196020 A1 | 7/2017 | Mukherjee et al. |
| 2017/0338912 A1 | 11/2017 | Nigam et al. |
| 2018/0270860 A1 | 9/2018 | Bhorkar et al. |

OTHER PUBLICATIONS

U.S. Non-final Office Action dated Oct. 13, 2022, issued in U.S. Appl. No. 17/092,274.
3GPP TSG RAN WG1 #80 R1-150359 Athens, Greece, Feb. 9-13, 2015, Source: Samsung, Title: Enhancements to DL control signaling for CA with up to 32 CCs.
3GPP TSG RAN WG1 meeting #80 R1-151500, Belgrade, Serbia, Apr. 20-24, 2015, Source: LG Electronics, Title: DL control enhancements for supporting Rel-13 CA.
3GPP TSG RAN WG1 #80 R1-151603 Belgrade, Serbia, Apr. 20-24, 2015, Source: Samsung, Title: Other DL control enhancements for CA with up to 32 CCs.
3GPP TSG RAN WG1 meeting #81 R1-152713, Fukuoka, Japan, May 25-29, 2015, Source: LG Electronics, Title: DL control enhancement for Rel-13 CA.
3GPP TSG RAN WG1 meeting #81 R1-152741, Fukuoka, Japan, May 25-29, 2015, Source: LG Electronics, Title: Scheduling and HARQ operation in LAA.
3GPP TSG-RAN WG1 meeting #81 R1-152820, Fukuoka, Japan, May 25-29, 2015, Source: Nokia Networks, Title: On reducing the number of DL control blind decodes.
3GPP TSG RAN WG1 #81 R1-152849, Fukuoka, Japan, May 25-29, 2015, Source: Samsung, Title: Other DL control enhancements for CA with up to 32 CCs.
3GPP TSG RAN WG1 meeting #81 R1-152990, Fukuoka, Japan, May 25-29, 2015, Source: Alcatel-Lucent Shanghai Bell, Alcatel-Lucent, Title: LBT and Frame Structure Design for LAA with DL and UL.
3GPP TSG RAN WG1 meeting #84 R1-160299, St. Julian's, Malta, Feb. 15-19, 2016, Source: Huawei, HiSilicon, Title: Scheduling design for eLAA.
3GPP TSG RAN WG1 meeting #84 R1-160331, St Julian's, Malta, Feb. 15-19, 2016, Source: ZTE, Title: Discussion on UL Scheduling for LAA.
3GPP TSG RAN WG1 meeting #84 R1-160389, St Julian's, Malta, Feb. 15-19, 2016, Source: NEC, Title: Discussion on LAA UL scheduling.
3GPP TSG RAN WG1 meeting #84 R1-160489, St Julian's, Malta, Feb. 15-19, 2016, Source: Fujitsu, Title: UL LBT and PUSCH Design for LAA.
3GPP TSG RAN WG1 meeting #84, R1-160495, St Julian's, Malta, Feb. 15-19, 2016, Source: CMCC, Title: Discussion on issues related to PUSCH transmission for LAA.
3GPP TSG RAN WG1 meeting #84 R1-160557, St Julian's, Malta, Feb. 15-19, 2016, Source: Samsung, Title: Discussion on multi-subframe scheduling for UL LAA.
3GPP TSG RAN WG1 meeting #84 R1-160593, St Julian's, Malta, Feb. 15-19, 2016, Source: OPPO, Title: PUSCH transmission on eLAA carrier.
3GPP TSG RAN WG1 meeting #84 R1-160625, St Julian's, Malta, Feb. 15-19, 2016, Source: LG Electronics, Title: PUSCH transmission in LAA.
3GPP TSG RAN WG1 meeting #84 R1-160629, St Julian's, Malta, Feb. 15-19, 2016, Source: LG Electronics, Title: Evaluation of LBT operation in LAA UL.
3GPP TSG RAN WG1 meeting #84 R160630, St Julian's, Malta, Feb. 15-19, 2016, Source: LG Electronics, Title: LBT schemes in LAA UL.
3GPP TSG RAN WG1 meeting #84 R1-160788, St Julian's, Malta, Feb. 15-19, 2016, Source: Nokia Networks, Alcatel-Lucent, Alcatel-Lucent Shanghai Bell, Title: On LAA PUSCH scheduling and UL grant enhancements.
3GPP TSG RAN WG1 #84 R1-160885, St Julian's, Malta, Feb. 15-19, 2016, Source: Qualcomm Incorporated; Title: Control details for UL in LAA.
3GPP TSG RAN WG1 meeting #84 R1-160947, St Julian's, Malta, Feb. 15-19, 2016, Source: NTT DOCOMO, Inc., Title: Discussion on UL scheduling design for eLAA.
3GPP TSG RAN WG1 meeting #84 R1-160995, St Julian's, Malta, Feb. 15-19, 2016, Source: Ericsson, Title: On Scheduling Methods for Enhanced LAA.
3GPP TSG-RAN WG1 meeting #84 R1-161079, St Julian's, Malta, Feb. 15-19, 2016, Source: InterDigital Communications, Title: On UL data transmission for eLAA.
U.S. Office Action dated Mar. 15, 2023, issued in U.S. Appl. No. 17/092,274.

\* cited by examiner

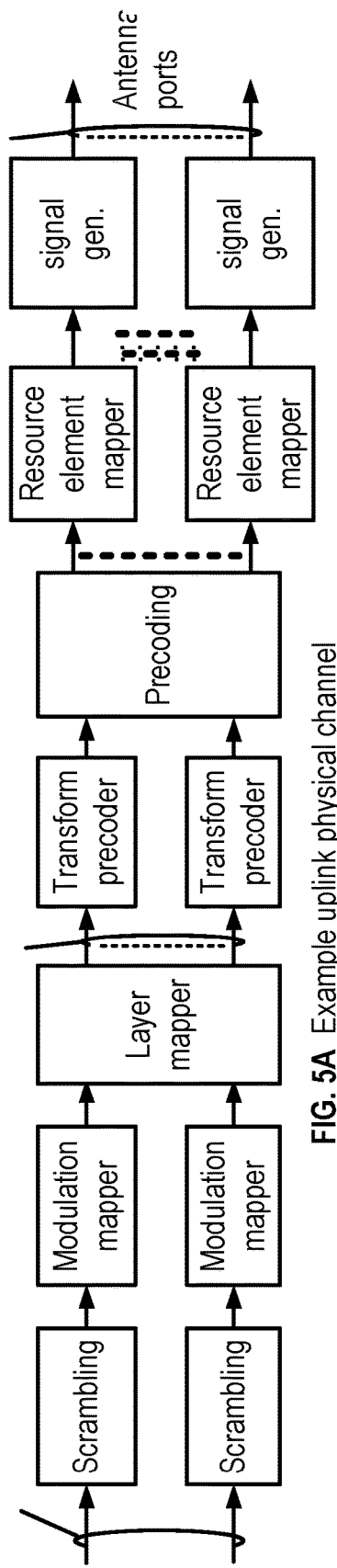
FIG. 5A Example uplink physical channel
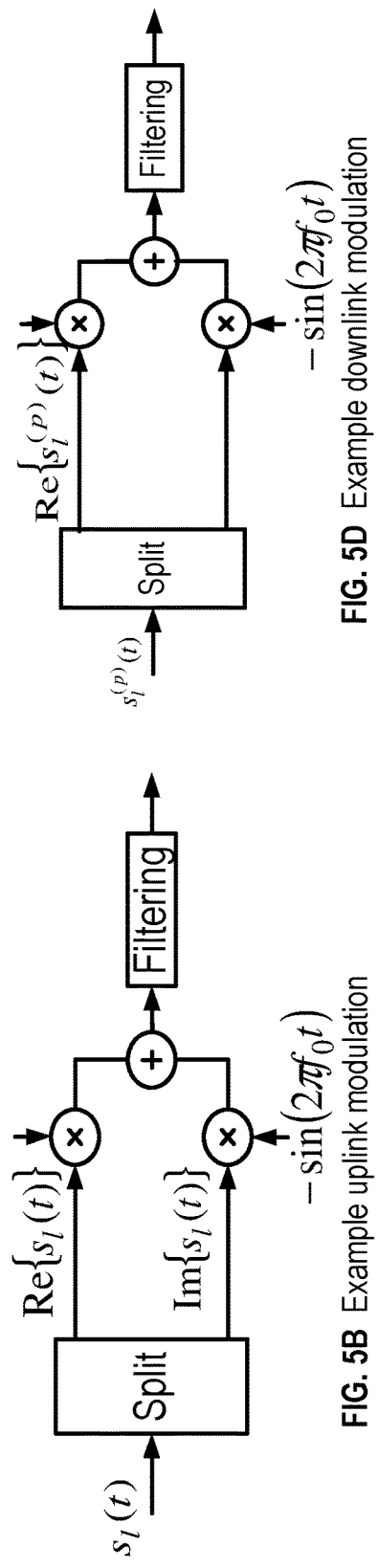
FIG. 5B Example uplink modulation
FIG. 5D Example downlink modulation
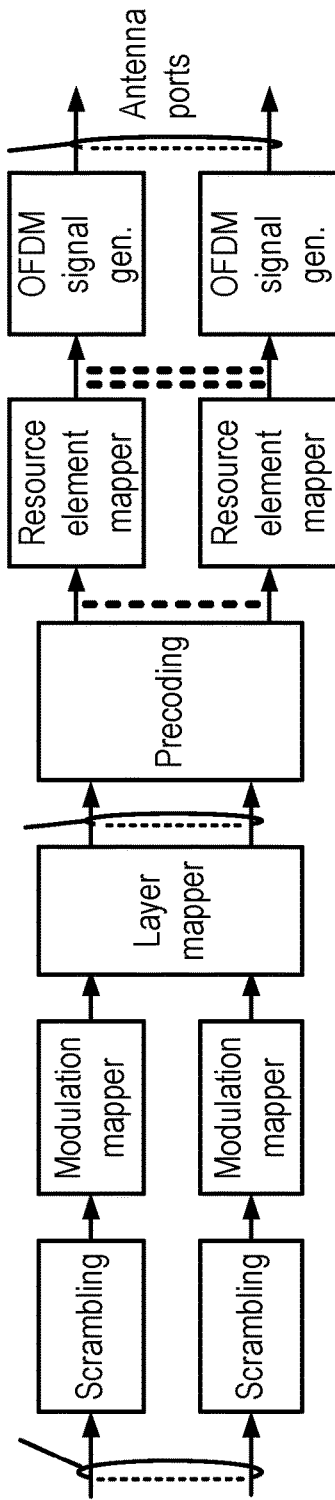
FIG. 5C Example downlink physical channel Dual-Connectivity at eNB FIG. 7 Dual-Connectivity - two MAC entities at UE side

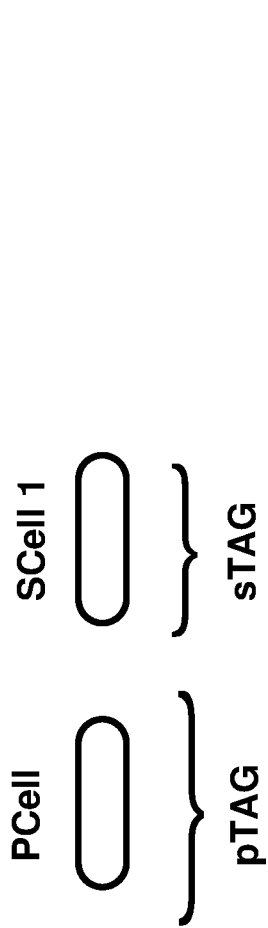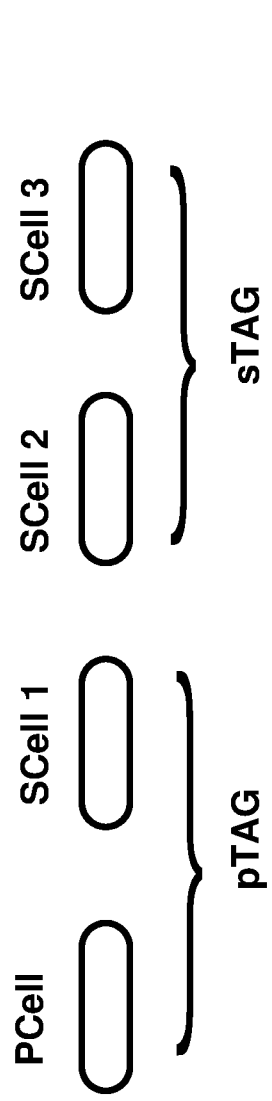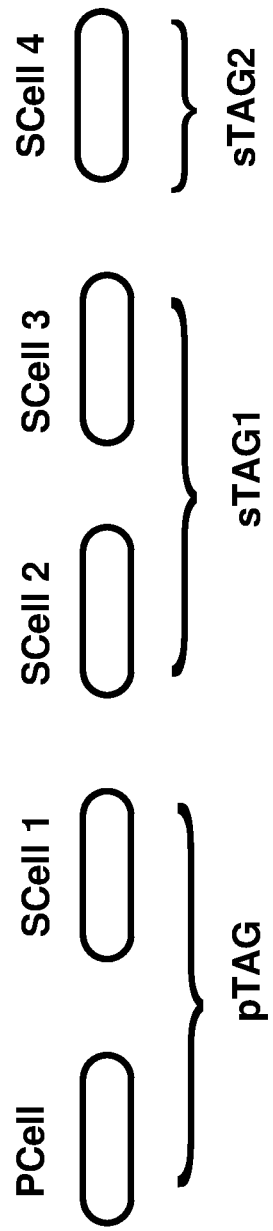
FIG. 8

| No of scheduled subframes field: 3 |
| --- |
| Resource Block field |
| MCS field |
| TPC field |
| LBT field(s) |
| HARQ ID |
| Redundancy Version 1 |
| New Data Indicator 1 |
| Redundancy Version 2 |
| New Data Indicator 2 |
| Redundancy Version 3 |
| New Data Indicator 3 |

• • •

Example fields of an example MSFG DCI when the number of scheduled subframes is 3

FIG. 15

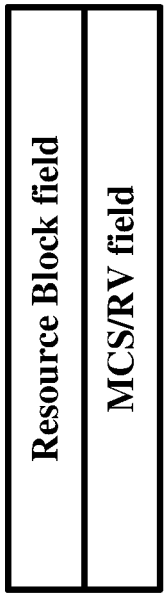
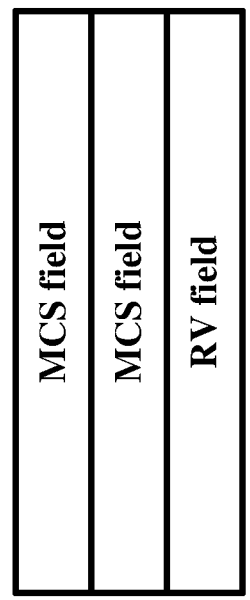
Example fields of an uplink DCI for a licensed cell
Example fields of an uplink DCI for an unlicensed (e.g. LAA) cell
FIG. 16

DOWNLINK CONTROL INFORMATION FIELDS FOR A LICENSED CELL AND AN UNLICENSED CELL IN A WIRELESS NETWORK

CROSS-REFERENCE TO RELATED APPLICATIONS

This application is a continuation application of prior application Ser. No. 16/783,033, filed on Feb. 5, 2020, which has issued as U.S. Pat. No. 11,190,297 on Nov. 30, 2021 and is a continuation application of prior application Ser. No. 15/421,991, filed on Feb. 1, 2017, which has issued as U.S. Pat. No. 10,567,110 on Feb. 18, 2020 and is based on and claims priority under 35 U.S.C. § 119(e) of a U.S. Provisional application Ser. No. 62/309,885, filed on Mar. 17, 2016, in the U.S. Patent and Trademark Office, and of a U.S. Provisional Application 62/313,009, filed on Mar. 24, 2016, in the U.S. Patent and Trademark Office, the disclosure of each of which is incorporated by reference herein in its entirety.

BRIEF DESCRIPTION OF THE SEVERAL VIEWS OF THE DRAWINGS

Examples of several of the various embodiments of the present disclosure are described herein with reference to the drawings.

FIG. 5A, FIG. 5B, FIG. 5C and FIG. 5D are example diagrams for uplink and downlink signal transmission as per an aspect of an embodiment of the present disclosure.

FIG. 8 shows example TAG configurations as per an aspect of an embodiment of the present disclosure.

FIG. 15 is an example diagram depicting example DCI fields as per an aspect of an embodiment of the present disclosure.

FIG. 16 is an example DCI fields as per an aspect of an embodiment of the present disclosure.

DETAILED DESCRIPTION OF EMBODIMENTS

Figure 1:
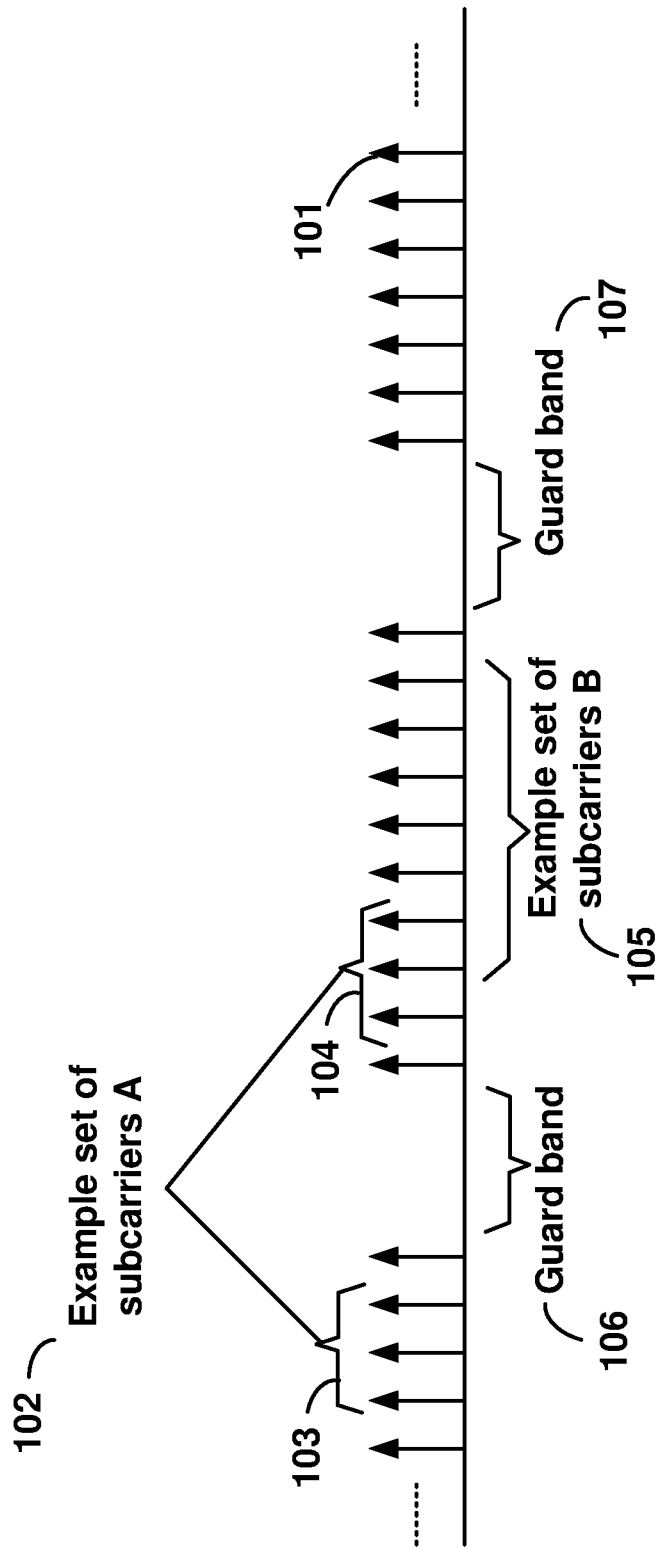
FIG. 1 is a diagram depicting example sets of OFDM subcarriers as per an aspect of an embodiment of the present disclosure.

Example embodiments of the present disclosure enable operation of carrier aggregation. Embodiments of the technology disclosed herein may be employed in the technical field of multicarrier communication systems.

The following Acronyms are used throughout the present disclosure:

ASIC application-specific integrated circuit
BPSK binary phase shift keying
CA carrier aggregation
CSI channel state information
CDMA code division multiple access
CSS common search space
CPLD complex programmable logic devices
CC component carrier
DL downlink
DCI downlink control information
DC dual connectivity
EPC evolved packet core
E-UTRAN evolved-universal terrestrial radio access network
FPGA field programmable gate arrays
FDD frequency division multiplexing
HDL hardware description languages
HARQ hybrid automatic repeat request
IE information element
LAA licensed assisted access
LTE long term evolution
MCG master cell group
MeNB master evolved node B
MIB master information block
MAC media access control
MAC media access control
MME mobility management entity
NAS non-access stratum
OFDM orthogonal frequency division multiplexing
PDCP packet data convergence protocol
PDU packet data unit
PHY physical
PDCCH physical downlink control channel
PHICH physical HARQ indicator channel PUCCH physical uplink control channel
PUSCH physical uplink shared channel
PCell primary cell
PCell primary cell
PCC primary component carrier
PSCell primary secondary cell
pTAG primary timing advance group
QAM quadrature amplitude modulation
QPSK quadrature phase shift keying
RBG Resource Block Groups
RLC radio link control
RRC radio resource control
RA random access
RB resource blocks
SCC secondary component carrier
SCell secondary cell
Scell secondary cells
SCG secondary cell group
SeNB secondary evolved node B
sTAGs secondary timing advance group
SDU service data unit
S-GW serving gateway
SRB signaling radio bearer
SC-OFDM single carrier-OFDM
SFN system frame number
SIB system information block
TAI tracking area identifier
TAT time alignment timer
TDD time division duplexing
TDMA time division multiple access
TA timing advance
TAG timing advance group
TB transport block
UL uplink
UE user equipment
VHDL VHSIC hardware description language Example embodiments of the disclosure may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present disclosure. As illustrated in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
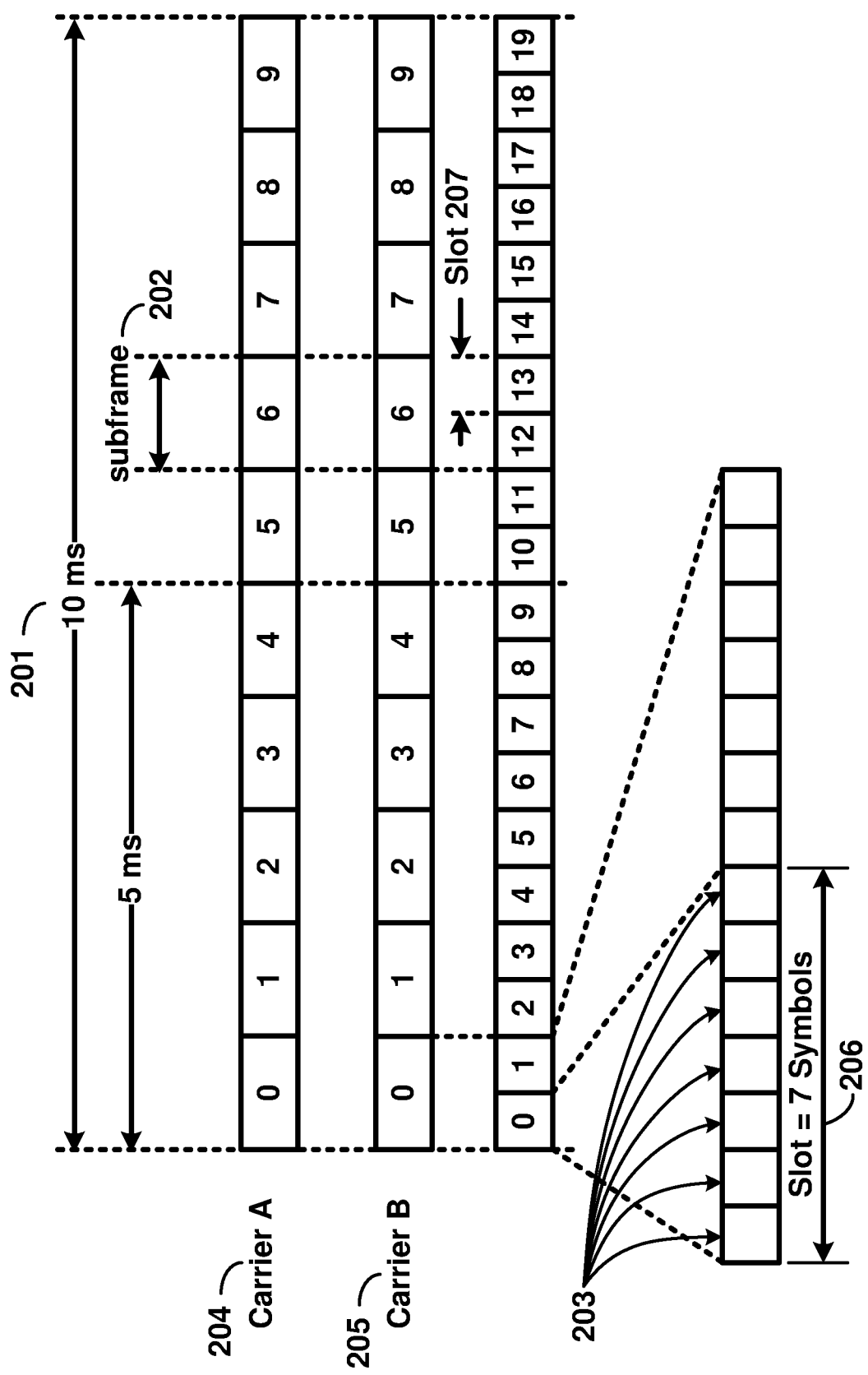
FIG. 2 is a diagram depicting an example transmission time and reception time for two carriers in a carrier group as per an aspect of an embodiment of the present disclosure.

FIG. 2 is a diagram depicting an example transmission time and reception time for two carriers as per an aspect of an embodiment of the present disclosure. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, the radio frame duration is 10 msec. Other frame durations, for example, in the range of 1 to 100 msec may also be supported. In this example, each 10 ms radio frame 201 may be divided into ten equally sized subframes 202. Other subframe durations such as 0.5 msec, 1 msec, 2 msec, and 5 msec may also be supported. Subframe(s) may consist of two or more slots (for example, slots 206 and 207). For the example of FDD, 10 subframes may be available for downlink transmission and 10 subframes may be available for uplink transmissions in each 10 ms interval. Uplink and downlink transmissions may be separated in the frequency domain. Slot(s) may include a plurality of OFDM symbols 203. The number of OFDM symbols 203 in a slot 206 may depend on the cyclic prefix length and subcarrier spacing.

Figure 3:
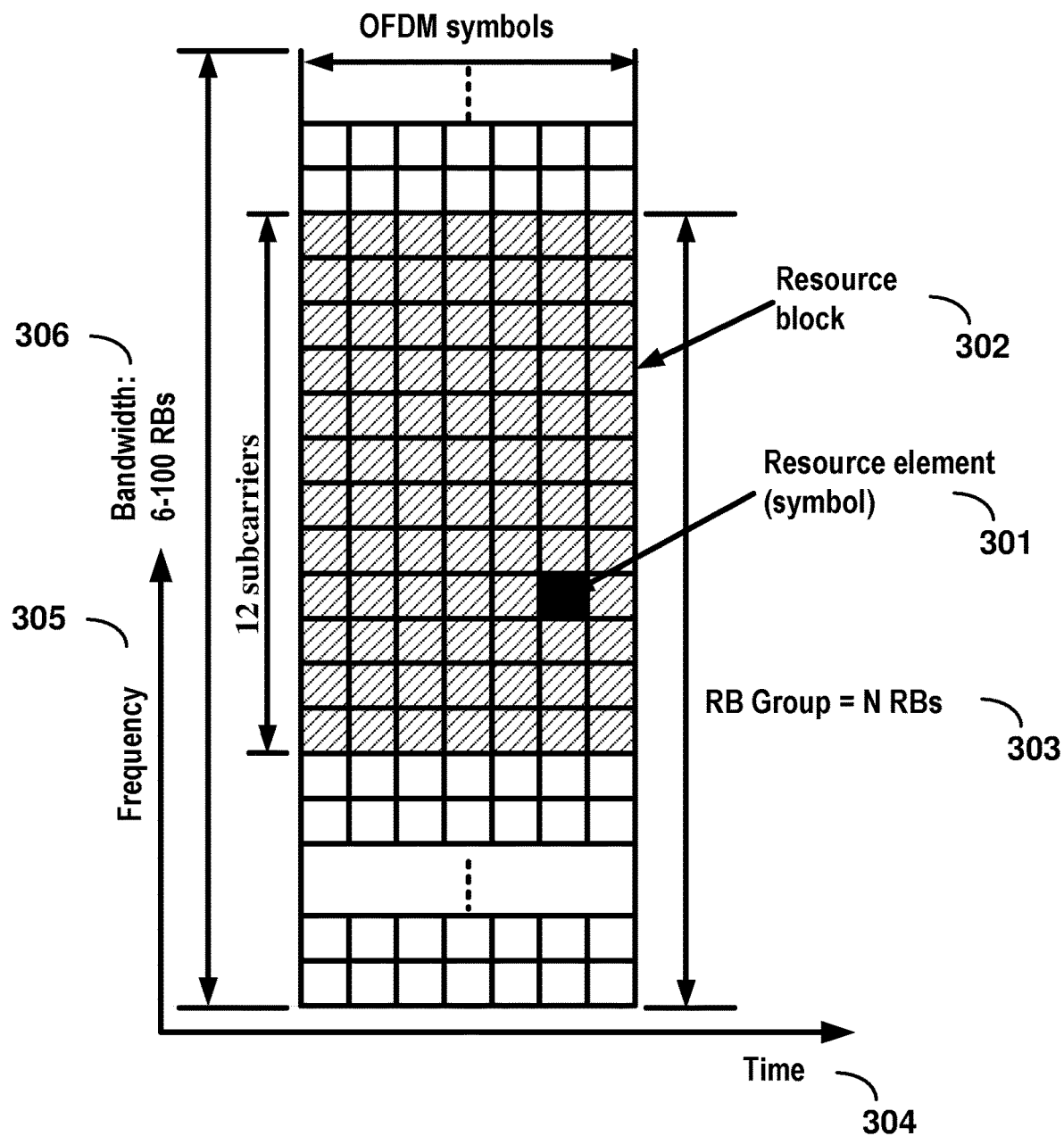
FIG. 3 is an example diagram depicting OFDM radio resources as per an aspect of an embodiment of the present disclosure.

FIG. 3 is a diagram depicting OFDM radio resources as per an aspect of an embodiment of the present disclosure. The resource grid structure in time 304 and frequency 305 is illustrated in FIG. 3. The quantity of downlink subcarriers or RBs (in this example 6 to 100 RBs) may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

FIG. 5A, FIG. 5B, FIG. 5C and FIG. 5D are example diagrams for uplink and downlink signal transmission as per an aspect of an embodiment of the present disclosure. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain DFTS-OFDM/SC-FDMA signal for each antenna port, and/or the like.

Example modulation and up-conversion to the carrier frequency of the complex-valued DFTS-OFDM/SC-FDMA baseband signal for each antenna port and/or the complex-valued PRACH baseband signal is shown in FIG. 5B. Filtering may be employed prior to transmission.

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in each of the codewords to be transmitted on a physical channel; modulation of scrambled bits to generate complex-valued modulation symbols; mapping of the complex-valued modulation symbols onto one or several transmission layers; precoding of the complex-valued modulation symbols on each layer for transmission on the antenna ports; mapping of complex-valued modulation symbols for each antenna port to resource elements; generation of complex-valued time-domain OFDM signal for each antenna port, and/or the like.

Example modulation and up-conversion to the carrier frequency of the complex-valued OFDM baseband signal for each antenna port is shown in FIG. 5D. Filtering may be employed prior to transmission.

Figure 4:
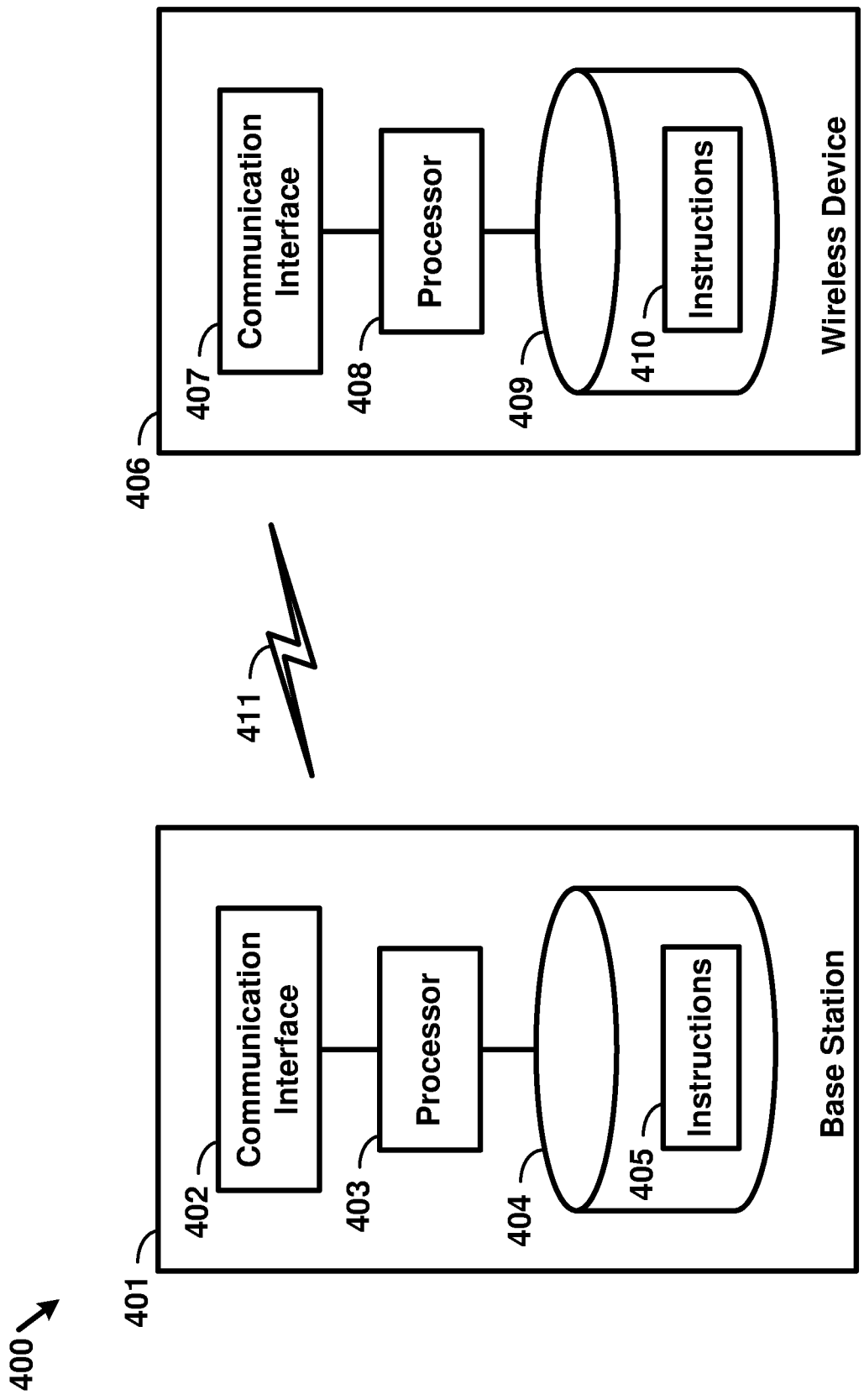
FIG. 4 is an example block diagram of a base station and a wireless device as per an aspect of an embodiment of the present disclosure.

FIG. 4 is an example block diagram of a base station 401 and a wireless device 406, as per an aspect of an embodiment of the present disclosure. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to aspects of an embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

According to various aspects of an embodiment, an LTE network may include a multitude of base stations, providing a user plane PDCP/RLC/MAC/PHY and control plane (RRC) protocol terminations towards the wireless device. The base station(s) may be interconnected with other base station(s) (for example, interconnected employing an X2 interface). Base stations may also be connected employing, for example, an S1 interface to an EPC. For example, base stations may be interconnected to the MME employing the S1-MME interface and to the S-G) employing the S1-U interface. The S1 interface may support a many-to-many relation between MMEs/Serving Gateways and base stations. A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, the carrier corresponding to the PCell may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply, for example, to carrier activation. When the specification indicates that a first carrier is activated, the specification may also mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE technology.

Figure 6:
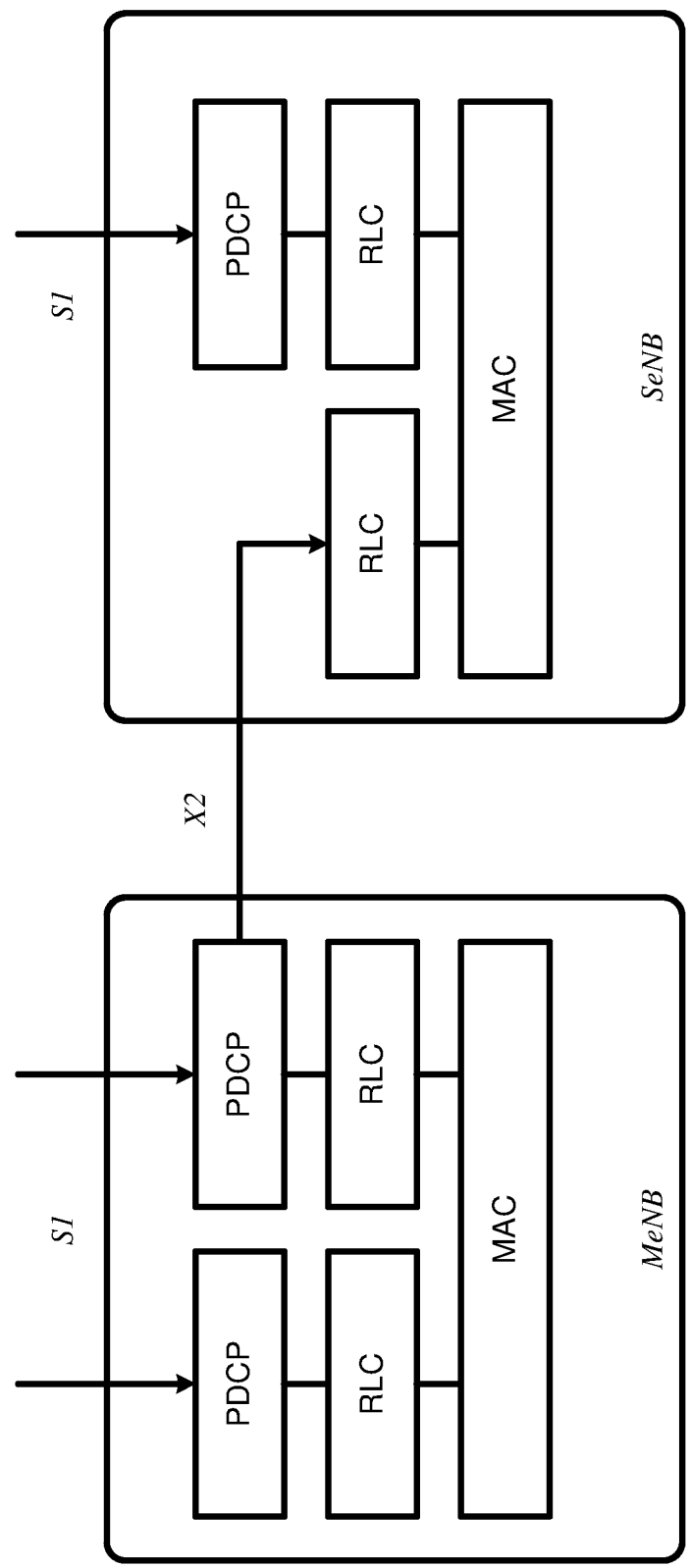
FIG. 6 is an example diagram for a protocol structure with CA and DC as per an aspect of an embodiment of the present disclosure.
Figure 7:
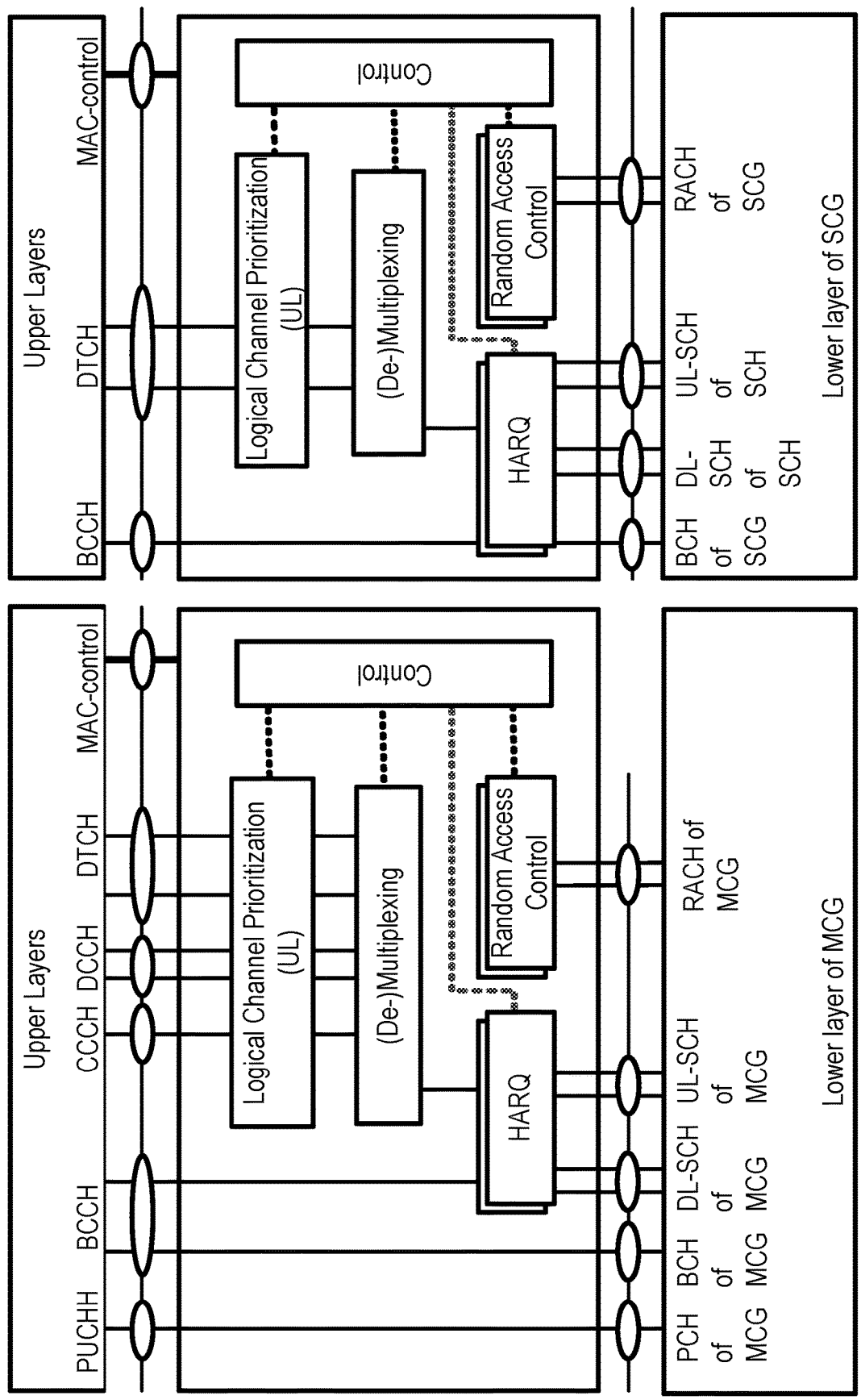
FIG. 7 is an example diagram for a protocol structure with CA and DC as per an aspect of an embodiment of the present disclosure.

FIG. 6 and FIG. 7 are example diagrams for protocol structure with CA and DC as per an aspect of an embodiment of the present disclosure. E-UTRAN may support Dual Connectivity (DC) operation whereby a multiple RX/TX UE in RRC CONNECTED may be configured to utilize radio resources provided by two schedulers located in two eNBs connected via a non-ideal backhaul over the X2 interface. eNBs involved in DC for a certain UE may assume two different roles: an eNB may either act as an MeNB or as an SeNB. In DC a UE may be connected to one MeNB and one SeNB. Mechanisms implemented in DC may be extended to cover more than two eNBs. FIG. 7 illustrates one example structure for the UE side MAC entities when a Master Cell Group (MCG) and a Secondary Cell Group (SCG) are configured, and it may not restrict implementation. Media Broadcast Multicast Service (MBMS) reception is not shown in this figure for simplicity.

In DC, the radio protocol architecture that a particular bearer uses may depend on how the bearer is setup. Three alternatives may exist, an MCG bearer, an SCG bearer and a split bearer as shown in FIG. 6. RRC may be located in MeNB and SRBs may be configured as a MCG bearer type and may use the radio resources of the MeNB. DC may also be described as having at least one bearer configured to use radio resources provided by the SeNB. DC may or may not be configured/implemented in example embodiments of the disclosure.

In the case of DC, the UE may be configured with two MAC entities: one MAC entity for MeNB, and one MAC entity for SeNB. In DC, the configured set of serving cells for a UE may comprise two subsets: the Master Cell Group (MCG) containing the serving cells of the MeNB, and the Secondary Cell Group (SCG) containing the serving cells of the SeNB. For a SCG, one or more of the following may be applied. At least one cell in the SCG may have a configured UL CC and one of them, named PSCell (or PCell of SCG, or sometimes called PCell), may be configured with PUCCH resources. When the SCG is configured, there may be at least one SCG bearer or one Split bearer. Upon detection of a physical layer problem or a random access problem on a PSCell, or the maximum number of RLC retransmissions has been reached associated with the SCG, or upon detection of an access problem on a PSCell during a SCG addition or a SCG change: a RRC connection re-establishment procedure may not be triggered, UL transmissions towards cells of the SCG may be stopped, and a MeNB may be informed by the UE of a SCG failure type. For split bearer, the DL data transfer over the MeNB may be maintained. The RLC AM bearer may be configured for the split bearer. Like a PCell, a PSCell may not be de-activated. A PSCell may be changed with a SCG change (for example, with a security key change and a RACH procedure), and/or neither a direct bearer type change between a Split bearer and a SCG bearer nor simultaneous configuration of a SCG and a Split bearer may be supported.

With respect to the interaction between a MeNB and a SeNB, one or more of the following principles may be applied. The MeNB may maintain the RRM measurement configuration of the UE and may, (for example, based on received measurement reports or traffic conditions or bearer types), decide to ask a SeNB to provide additional resources (serving cells) for a UE. Upon receiving a request from the MeNB, a SeNB may create a container that may result in the configuration of additional serving cells for the UE (or decide that it has no resource available to do so). For UE capability coordination, the MeNB may provide (part of) the AS configuration and the UE capabilities to the SeNB. The MeNB and the SeNB may exchange information about a UE configuration by employing RRC containers (inter-node messages) carried in X2 messages. The SeNB may initiate a reconfiguration of its existing serving cells (for example, a PUCCH towards the SeNB). The SeNB may decide which cell is the PSCell within the SCG. The MeNB may not change the content of the RRC configuration provided by the SeNB. In the case of a SCG addition and a SCG SCell addition, the MeNB may provide the latest measurement results for the SCG cell(s). Both a MeNB and a SeNB may know the SFN and subframe offset of each other by OAM, (for example, for the purpose of DRX alignment and identification of a measurement gap). In an example, when adding a new SCG SCell, dedicated RRC signaling may be used for sending required system information of the cell as for CA, except for the SFN acquired from a MIB of the PSCell of a SCG.

In an example, serving cells may be grouped in a TA group (TAG). Serving cells in one TAG may use the same timing reference. For a given TAG, user equipment (UE) may use at least one downlink carrier as a timing reference. For a given TAG, a UE may synchronize uplink subframe and frame transmission timing of uplink carriers belonging to the same TAG. In an example, serving cells having an uplink to which the same TA applies may correspond to serving cells hosted by the same receiver. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). In an example, carriers within the same TA group may use the same TA value and/or the same timing reference. When DC is configured, cells belonging to a cell group (MCG or SCG) may be grouped into multiple TAGs including a pTAG and one or more sTAGs.

FIG. 8 shows example TAG configurations as per an aspect of an embodiment of the present disclosure. In Example 1, pTAG comprises a PCell, and an sTAG comprises SCell1. In Example 2, a pTAG comprises a PCell and SCell1, and an sTAG comprises SCell2 and SCell3. In Example 3, pTAG comprises PCell and SCell1, and an sTAG1 includes SCell2 and SCell3, and sTAG2 comprises SCell4. Up to four TAGs may be supported in a cell group (MCG or SCG) and other example TAG configurations may also be provided. In various examples in this disclosure, example mechanisms are described for a pTAG and an sTAG. Some of the example mechanisms may be applied to configurations with multiple sTAGs.

In an example, an eNB may initiate an RA procedure via a PDCCH order for an activated SCell. This PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
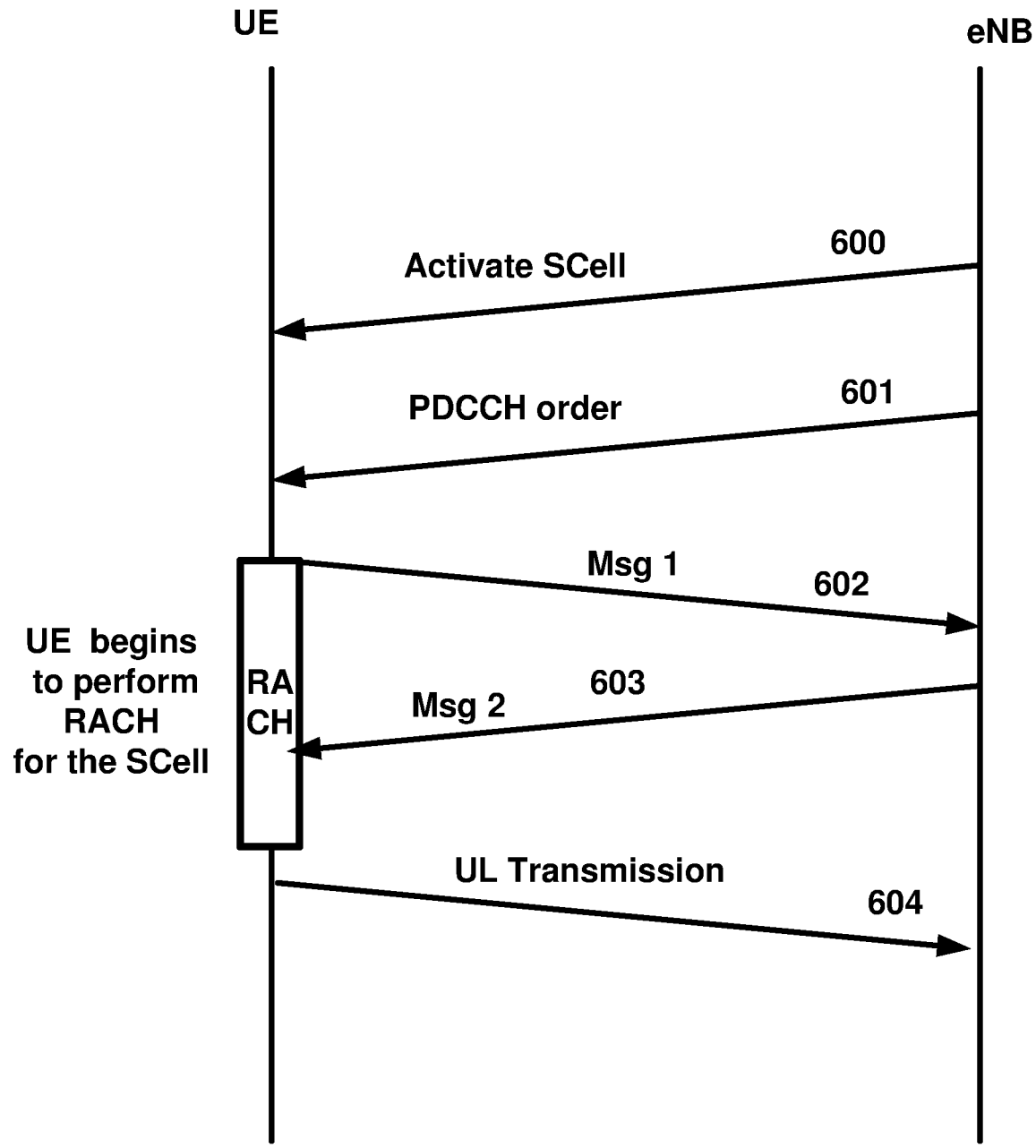
FIG. 9 is an example message flow in a random access process in a secondary TAG as per an aspect of an embodiment of the present disclosure.

FIG. 9 is an example message flow in a random access process in a secondary TAG as per an aspect of an embodiment of the present disclosure. An eNB transmits an activation command 600 to activate an SCell. A preamble 602 (Msg1) may be sent by a UE in response to a PDCCH order 601 on an SCell belonging to an sTAG. In an example embodiment, preamble transmission for SCells may be controlled by the network using PDCCH format 1A. Msg2 message 603 (RAR: random access response) in response to the preamble transmission on the SCell may be addressed to RA-RNTI in a PCell common search space (CSS). Uplink packets 604 may be transmitted on the SCell in which the preamble was transmitted.

According to an embodiment, initial timing alignment may be achieved through a random access procedure. This may involve a UE transmitting a random access preamble and an eNB responding with an initial TA command NTA (amount of timing advance) within a random access response window. The start of the random access preamble may be aligned with the start of a corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to various aspects of an embodiment, when an eNB performs an SCell addition configuration, the related TAG configuration may be configured for the SCell. In an example embodiment, an eNB may modify the TAG configuration of an SCell by removing (releasing) the SCell and adding (configuring) a new SCell (with the same physical cell ID and frequency) with an updated TAG ID. The new S Cell with the updated TAG ID may initially be inactive subsequent to being assigned the updated TAG ID. The eNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from an sTAG to a pTAG, at least one RRC message, (for example, at least one RRC reconfiguration message), may be send to the UE to reconfigure TAG configurations by releasing the SCell and then configuring the SCell as a part of the pTAG. When an SCell is added/configured without a TAG index, the SCell may be explicitly assigned to the pTAG. The PCell may not change its TA group and may be a member of the pTAG.

The purpose of an RRC connection reconfiguration procedure may be to modify an RRC connection, (for example, to establish, modify and/or release RBs, to perform handover, to setup, modify, and/or release measurements, to add, modify, and/or release SCells). If the received RRC Connection Reconfiguration message includes the sCellToReleaseList, the UE may perform an SCell release. If the received RRC Connection Reconfiguration message includes the sCellToAddModList, the UE may perform SCell additions or modification.

In LTE Release-10 and Release-11 CA, a PUCCH may only be transmitted on the PCell (PSCell) to an eNB. In LTE-Release 12 and earlier, a UE may transmit PUCCH information on one cell (PCell or PSCell) to a given eNB.

As the number of CA capable UEs and also the number of aggregated carriers increase, the number of PUCCHs and also the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. In the example embodiments, one, two or more cells may be configured with PUCCH resources for transmitting CSI/ACK/NACK to a base station. Cells may be grouped into multiple PUCCH groups, and one or more cell within a group may be configured with a PUCCH. In an example configuration, one SCell may belong to one PUCCH group. SCells with a configured PUCCH transmitted to a base station may be called a PUCCH SCell, and a cell group with a common PUCCH resource transmitted to the same base station may be called a PUCCH group.

In an example embodiment, a MAC entity may have a configurable timer timeAlignmentTimer per TAG. The timeAlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random Access Response message for a serving cell belonging to a TAG and/or if the Random Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command.

In example embodiments, a timer is running once it is started, until it is stopped or until it expires; otherwise it may not be running A timer can be started if it is not running or restarted if it is running. For example, a timer may be started or restarted from its initial value.

Example embodiments of the disclosure may enable operation of multi-carrier communications. Other example embodiments may comprise a non-transitory tangible computer readable media comprising instructions executable by one or more processors to cause operation of multi-carrier communications. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multi-carrier communications. The device may include processors, memory, interfaces, and/or the like. Other example embodiments may comprise communication networks comprising devices such as base stations, wireless devices (or user equipment: UE), servers, switches, antennas, and/or the like.

The amount of data traffic carried over cellular networks is expected to increase for many years to come. The number of users/devices is increasing and each user/device accesses an increasing number and variety of services, e.g. video delivery, large files, images. This may require not only high capacity in the network, but also provisioning very high data rates to meet customers' expectations on interactivity and responsiveness. More spectrum may therefore needed for cellular operators to meet the increasing demand. Considering user expectations of high data rates along with seamless mobility, it may be beneficial that more spectrum be made available for deploying macro cells as well as small cells for cellular systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, when present, may be an effective complement to licensed spectrum for cellular operators to help addressing the traffic explosion in some scenarios, such as hotspot areas. LAA may offer an alternative for operators to make use of unlicensed spectrum while managing one radio network, thus offering new possibilities for optimizing the network's efficiency.

In an example embodiment, Listen-before-talk (clear channel assessment) may be implemented for transmission in an LAA cell. In a listen-before-talk (LBT) procedure, equipment may apply a clear channel assessment (CCA) check before using the channel. For example, the CCA may utilize at least energy detection to determine the presence or absence of other signals on a channel in order to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

In an example embodiment, discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by UEs, time & frequency synchronization of UEs, and/or the like.

In an example embodiment, a DL LAA design may employ subframe boundary alignment according to LTE-A carrier aggregation timing relationships across serving cells aggregated by CA. This may not imply that the eNB transmissions can start only at the subframe boundary. LAA may support transmitting PDSCH when not all OFDM symbols are available for transmission in a subframe according to LBT. Delivery of necessary control information for the PDSCH may also be supported.

An LBT procedure may be employed for fair and friendly coexistence of LAA with other operators and technologies operating in an unlicensed spectrum. LBT procedures on a node attempting to transmit on a carrier in an unlicensed spectrum may require the node to perform a clear channel assessment to determine if the channel is free for use. An LBT procedure may involve at least energy detection to determine if the channel is being used. For example, regulatory requirements in some regions, for example, in Europe, may specify an energy detection threshold such that if a node receives energy greater than this threshold, the node assumes that the channel is not free. While nodes may follow such regulatory requirements, a node may optionally use a lower threshold for energy detection than that specified by regulatory requirements. In an example, LAA may employ a mechanism to adaptively change the energy detection threshold. For example, LAA may employ a mechanism to adaptively lower the energy detection threshold from an upper bound. Adaptation mechanism(s) may not preclude static or semi-static setting of the threshold. In an example a Category 4 LBT mechanism or other type of LBT mechanisms may be implemented.

Various example LBT mechanisms may be implemented. In an example, for some signals, in some implementation scenarios, in some situations, and/or in some frequencies, no LBT procedure may performed by the transmitting entity. In an example, Category 2 (for example, LBT without random back-off) may be implemented. The duration of time that the channel is sensed to be idle before the transmitting entity transmits may be deterministic. In an example, Category 3 (for example, LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting entity transmits on the channel. In an example, Category 4 (for example, LBT with random back-off with a contention window of variable size) may be implemented. The transmitting entity may draw a random number N within a contention window. The size of the contention window may be specified by a minimum and maximum value of N. The transmitting entity may vary the size of the contention window when drawing the random number N. The random number N may be employed in the LBT procedure to determine the duration of time that the channel is sensed to be idle before the transmitting entity transmits on the channel.

LAA may employ uplink LBT at the UE. The UL LBT scheme may be different from the DL LBT scheme (for example, by using different LBT mechanisms or parameters), since the LAA UL may be based on scheduled access which affects a UE's channel contention opportunities. Other considerations motivating a different UL LBT scheme include, but are not limited to, multiplexing of multiple UEs in a single subframe.

In an example, a DL transmission burst may be a continuous transmission from a DL transmitting node with no transmission immediately before or after from the same node on the same CC. A UL transmission burst from a UE perspective may be a continuous transmission from a UE with no transmission immediately before or after from the same UE on the same CC. In an example, a UL transmission burst may be defined from a UE perspective. In an example, a UL transmission burst may be defined from an eNB perspective. In an example, in case of an eNB operating DL+UL LAA over the same unlicensed carrier, DL transmission burst(s) and UL transmission burst(s) on LAA may be scheduled in a TDM manner over the same unlicensed carrier. For example, an instant in time may be part of a DL transmission burst or an UL transmission burst.

Figure 10:
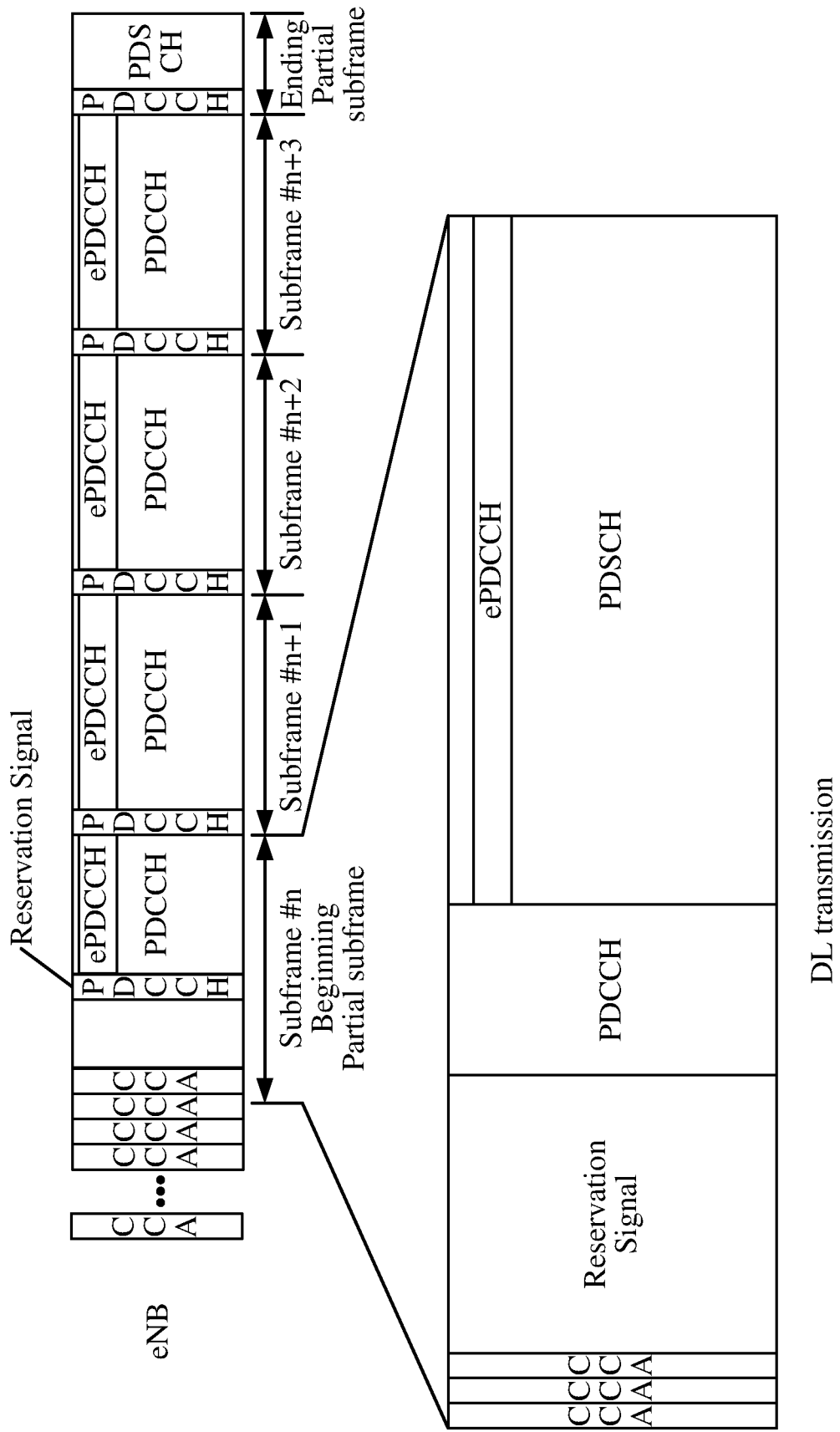
FIG. 10 is an example diagram depicting a downlink burst as per an aspect of an embodiment of the present disclosure.

In an example embodiment, in an unlicensed cell, a downlink burst may be started in a subframe. When an eNB accesses the channel, the eNB may transmit for a duration of one or more subframes. The duration may depend on a maximum configured burst duration in an eNB, the data available for transmission, and/or eNB scheduling algorithm FIG. 10 shows an example downlink burst in an unlicensed (e.g. licensed assisted access) cell. The maximum configured burst duration in the example embodiment may be configured in the eNB. An eNB may transmit the maximum configured burst duration to a UE employing an RRC configuration message.

The wireless device may receive from a base station at least one message (for example, an RRC) comprising configuration parameters of a plurality of cells. The plurality of cells may comprise at least one license cell and at least one unlicensed (for example, an LAA cell). The configuration parameters of a cell may, for example, comprise configuration parameters for physical channels, (for example, a ePDCCH, PDSCH, PUSCH, PUCCH and/or the like).

Frame structure type 3 may be applicable to an unlicensed (for example, LAA) secondary cell operation. In an example, frame structure type 3 may be implemented with normal cyclic prefix only. A radio frame may be $T_f=307200 \cdot T_s=10$ ms long and may comprise 20 slots of length $T_{slot}=15360 \cdot T_s=0.5$ ms, numbered from 0 to 19. A subframe may be defined as two consecutive slots where subframe i comprises of slots 2i and 2i+1. In an example, the 10 subframes within a radio frame may be available for downlink and/or uplink transmissions. Downlink transmissions may occupy one or more consecutive subframes, starting anywhere within a subframe and ending with the last subframe either fully occupied or following one of the DwPTS durations in a 3GPP Frame structure 2 (TDD frame). When an LAA cell is configured for uplink transmissions, frame structure 3 may be used for both uplink or downlink transmission.

An eNB may transmit one or more RRC messages to a wireless device (UE). The one or more RRC messages may comprise configuration parameters of a plurality of cells comprising one or more licensed cells and/or one or more unlicensed (for example, Licensed Assisted Access-LAA) cells. The one or more RRC messages may comprise configuration parameters for one or more unlicensed (for example, LAA) cells. An LAA cell may be configured for downlink and/or uplink transmissions.

In an example, the configuration parameters may comprise a first configuration field having a value of N for an LAA cell. The parameter N may be RRC configurable. N may be a cell specific or a UE specific RRC parameter. For example, N (for example, 6, 8, 16) may indicate a maximum number of HARQ processes that may be configured for UL transmissions. In an example, the RRC message may comprise an RNTI parameter for a multi-subframe DCI. In an example, one or more RRC messages may comprise configuration parameters of multi-subframe allocation parameters, maximum number of HARQ processes in the uplink, and/or other parameters associated with an LAA cell.

In an example, a UE may receive a downlink control information (DCI) indicating uplink resources (resource blocks for uplink grant) for uplink transmissions.

Figure 11:
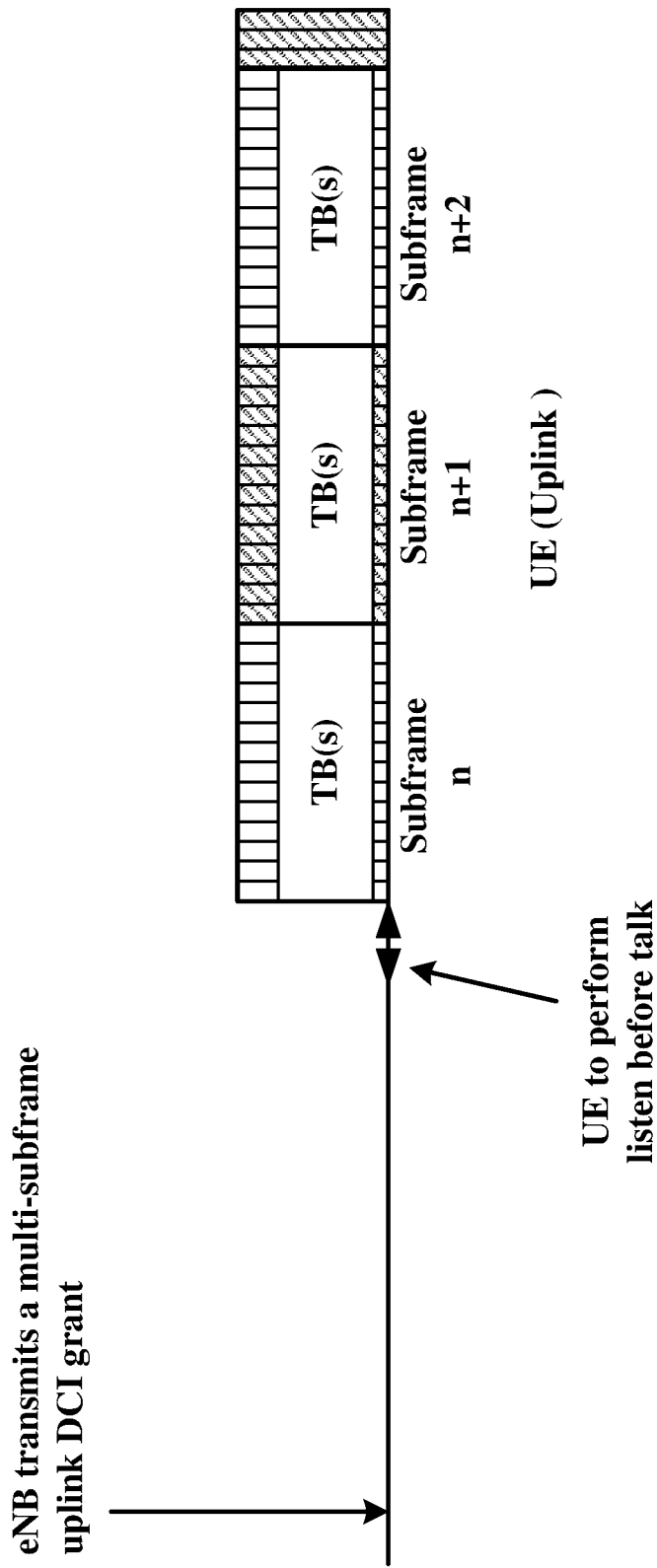
FIG. 11 is an example diagram depicting a plurality of cells as per an aspect of an embodiment of the present disclosure.

In an example embodiment, persistent (also called burst or multi-subframe) scheduling may be implemented. An eNB may schedule uplink transmissions by self scheduling and/or cross scheduling. In an example, an eNB may use UE C-RNTI for transmitting DCIs for multi-subframe grants. A UE may receive a multi-subframe DCI indicating uplink resources (resource blocks for uplink grant) for more than one consecutive uplink subframes (a burst), for example m subframes. In an example, a UE may transmit m subpackets (transport blocks-TBs), in response to the DCI grant. FIG. 11 shows an example multi-subframe grant, LBT process, and multi-subframe transmission.

In an example embodiment, an uplink DCI may comprise one or more fields including uplink RBs, a power control command, an MCS, the number of consecutive subframes (m), and/or other parameters for the uplink grant. FIG. 15 shows example fields of a multi-subframe DCI grant.

In an example, a multi-subframe DCI may comprise one or more parameters indicating that a DCI grant is a multi-subframe grant. A field in a multi-subframe DCI may indicate the number of scheduled consecutive subframes (m). For example, a DCI for an uplink grant on an LAA cell may comprise a 3-bit field. The value indicated by the 3-bit field may indicate the number of subframes associated with the uplink DCI grant (other examples may comprise, for example, a 1-bit field or a 2-bit field). For example, a value 000 may indicate a dynamic grant for one subframe. For example, a field value 011 may indicate a DCI indicating uplink resources for 4 scheduled subframes (m=field value in binary+1). In an example, RRC configuration parameters may comprise a first configuration field having a value of N for an LAA cell. In an example implementation, the field value may be configured to be less than N. For example, N may be configured as 2, and a maximum number of scheduled subframes in a multi-subframe grant may be 2. In an example, N may be configured as 4 and a maximum number of scheduled subframes in a multi-subframe grant may be 4. In an example, N may be a number of configured HARQ processes in an UL. Successive subframes on a carrier may be allocated to a UE when the UE receives a multi-subframe UL DCI grant from an eNB.

At least one field included in a multi-subframe DCI may determine transmission parameters and resource blocks used across m consecutive subframes for transmission of one or more TBs. The DCI may comprise an assignment of a plurality of resource blocks for uplink transmissions. The UE may use the RBs indicated in the DCI across m subframes. The same resource blocks may be allocated to the UE in m subframes as shown in FIG. 11.

Figure 14:
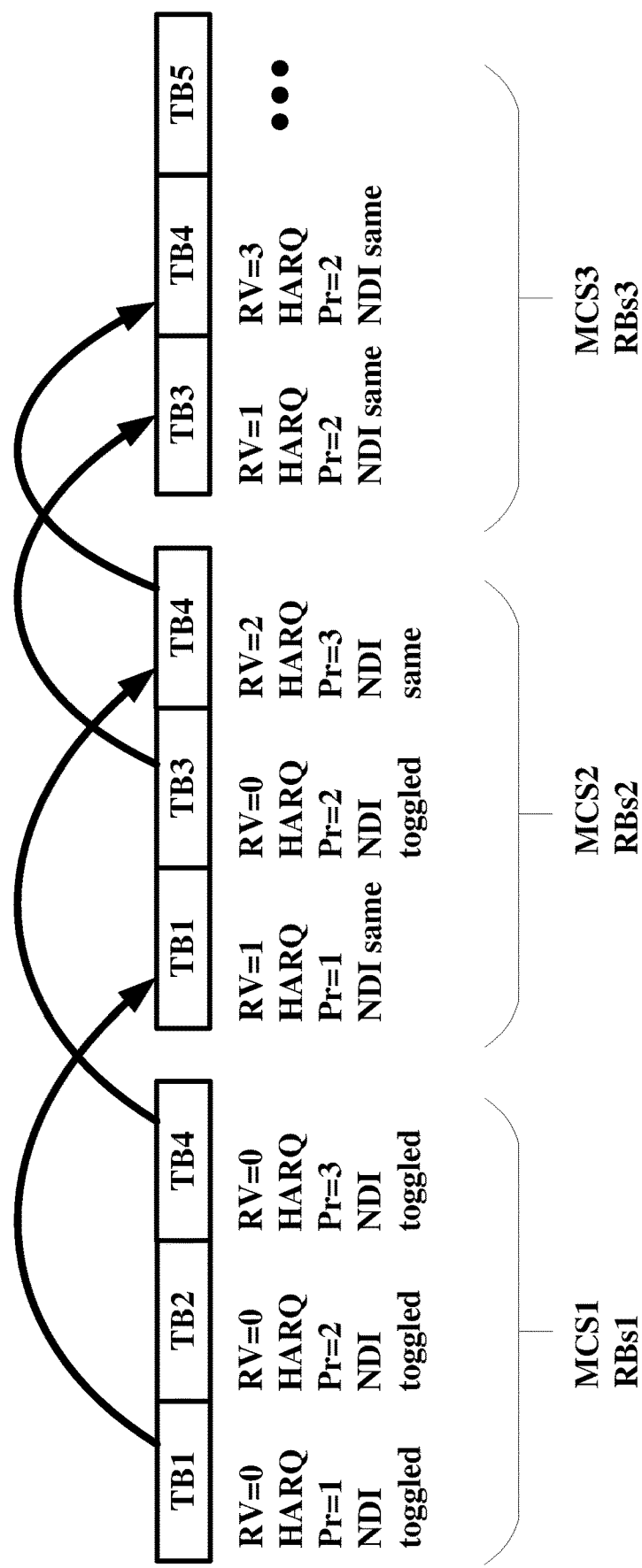
FIG. 14 is an example diagram depicting transport block transmissions using HARQ as per an aspect of an embodiment of the present disclosure.

Asynchronous UL HARQ may be employed for UL HARQ operation(s). An uplink DCI grant may comprise a HARQ process number (HARQ ID). The uplink DCI may further comprise at least one redundancy version (RV) and/or at least one new data indicator (NDI). At least one new transmission and/or at least one retransmission may be scheduled by PDCCH DCI in LAA uplink HARQ transmissions. Example embodiments may comprise processes for granting resources calculating HARQ IDs and transmission parameters for one or more first TBs of HARQ Process(es). Example HARQ Processes for transmission of TBs in multi-subframe bursts is shown in FIG. 14.

A UE may perform listen before talk (LBT) before transmitting uplink signals. The UE may perform an LBT procedure indicating that a channel is clear for a starting subframe of the one or more consecutive uplink subframes. The UE may not perform a transmission at the starting subframe if the LBT procedure indicates that the channel is not clear for the starting subframe.

A TB transmission may be associated with a HARQ process. Multiple HARQ processes may be associated with TB transmissions in multiple subframes, for example, subframes n, n+1, n+2, . . . , n+m−1.

A field in the multi-subframe DCI may indicate the number of subframes (m) associated with the uplink grant. For example, a multi-subframe DCI for an uplink grant on an LAA cell may comprise a 3-bit field, where a value indicated by the 3 bits may indicate the number of subframes associated with the grant (m=field value in binary+1). The DCI may further comprise a HARD process number (HARQ ID: h). In an example, when the HARQ ID in the DCI grant indicates HARQ process ID=h and the 3-bit field (m) is "000," the DCI may indicate a dynamic grant for one subframe and for HARQ ID=h. In an example, when HARQ ID=h and m is "011" (m=4), the DCI may indicate that the grant is also valid for subframes n+1, n+2 and n+3 for HARQ processes (h+1) Mod N, (h+2) Mod N and (h+3) Mod N, respectively. N may be a preconfigured number, for example, N=8 or 16. Mod is a modulo function. For example, N may be a number of configured HARQ processes. For example, when m=4, and h=3, and N=16, then HARQ process IDs may be 3, 4, 5, and 6, respectively for subframes n, n+1, n+2, and n+3, where the multi-subframe grant is associated with subframes n, n+1, n+2, and n+3.

In an example for m=3, and HARQ ID=h. HARQ ID for subframes n, n+1, and n+2 may be h mod N, (h+1) mod N, and (h+2) mod N. For example when h=1, and N=8, then h mod N=h=1, (h+1) mod N=h+1=2, and (h+2) mod N=h+2=3.

The UE may apply a multi-subframe grant to m HARQ processes. HARQ process ID may be incremented and rounded to modulo N: (HARQ_ID+i) modulo N. A first HARQ ID for a first subframe i in a multi-subframe burst may be calculated as: (the HARQ ID plus i) modulo a first pre-configured number. The parameter i may indicate a subframe position of the first subframe in the one or more consecutive uplink subframes. The parameter i may have a value of zero for a starting subframe. The parameter i may have a value of the number minus one (m−1) for an ending subframe. In an example, N may be a preconfigured number.

A DCI grant may comprise at least one redundancy version (RV), and at least one new data indicator (NDI). In an example, multi-subframe resource allocation may be applicable to uplink grants for a first TB (for example, first transmission) of one or more HARQ process.

In an example, for a LAA SCell, and transmission mode 1, there may be 16 uplink HARQ processes. For a LAA SCell, and transmission mode 2, there may be 32 uplink HARQ processes. In an example embodiment, for a serving cell that is an LAA SCell, a UE may upon detection of an PDCCH/EPDCCH with a multi-subframe uplink DCI grant for subframes starting subframe n, may perform a corresponding PUSCH transmission, conditioned on a successful LBT procedure, in subframe(s) n+i with i=0, 1, . . . , m−1 according to the PDCCH/EPDCCH and HARQ process ID mod $(n_{HARQ\_ID}+i, N_{HARQ})$.

Mod may be a module function. The value of m may be determined by the number of scheduled subframes field in the corresponding multi-subframe grant DCI format. The UE may be configured with a maximum value of m by an RRC parameter in the at least one RRC message. The value of $n_{HARQ\_ID}$ may be determined by the HARQ process number field in the corresponding multi-subframe uplink DCI format. In an example, $N_{HARQ}$ may be 16.

An example embodiment for calculating HARQ ID(s) may reduce the DCI size and reduce downlink control overhead. Instead of transmitting multiple HARQ IDs for multiple subframes, one HARQ ID may be included in the DCI for multiple subframes. Example embodiments provide a simple and efficient mechanism for calculating a HARQ ID for each subframe in a multi-subframe grant, when HARQ ID has an upper limit. Example embodiments may increase spectral efficiency, reduce downlink control overhead, and simplify UE processing related to HARQ processes.

In an example, one or more HARQ re-transmissions (if any) may be dynamically scheduled by the eNB employing uplink grant DCIs for one or more retransmissions. In an example embodiment, dynamic scheduling may be implemented. A UE may transmit in a subframe on a carrier if it receives an UL grant for that subframe.

In an example, when a UE receives a new UL DCI grant for a first transmission of one or more first TBs during applicability of a prior DCI grant (for example, multi-subframe DCI) on an LAA cell, the new DCI grant may override the old one.

An example embodiment for DCI processing may enable an eNB to transmit updated DCIs to over-ride previous DCIs when needed. This may enable an eNB and a UE to adjust and adapt to an updated scheduling in different scenarios depending on link parameters, HARQ transmissions, and LBT success or failure. This process may be employed to improve scheduling efficiency for an LAA cell.

In an example, a wireless device may receive, in a first subframe, a first multi-subframe DCI indicating first uplink resources for the LAA cell. The first DCI being for a number of one or more consecutive uplink subframes comprising a third subframe. The wireless device may receive, in a second subframe different from the first subframe, a second DCI indicating second uplink resources for the third subframe. In an example, a new grant may override the old one. The wireless device may transmit, via a plurality of resource blocks in the third subframe, one or more transport blocks according to parameters of the most recently received first DCI or second DCI.

In an example embodiment, in order to transmit on the UL-SCH, the MAC entity may have a valid uplink grant which it may receive dynamically on the (E)PDCCH or in a Random Access Response. To perform requested transmissions, the MAC layer may receive HARQ information from lower layers. When the physical layer is configured for uplink spatial multiplexing, the MAC layer may receive up to two grants (one per HARQ process) for the same TTI from lower layers.

There may be one HARQ entity at a MAC entity for a Serving Cell with a configured uplink, which may maintain a number of parallel HARQ processes allowing transmissions to take place continuously while waiting for the HARQ feedback on the successful or unsuccessful reception of previous transmissions. The number of parallel HARQ processes per HARQ entity may depend on UE capability(ies), for example, it may be 4, 6, 8, 16 or 32. In an example, when the physical layer is configured for uplink spatial multiplexing, there may be two HARQ processes associated with a given TT, otherwise there may be one HARQ process associated with a given TTI.

At a given TTI, if an uplink grant is indicated for the TTI, the HARQ entity may identify the HARQ process(es) for which a transmission may take place. The HARQ entity may route the received HARQ feedback (ACK/NACK information), MCS and resource, relayed by the physical layer, to appropriate HARQ process(es).

A HARQ process may be associated with a HARQ buffer. A HARQ process may maintain a state variable CURRENT_TX_NB, which indicates the number of transmissions that have taken place for the MAC PDU currently in the buffer, and a state variable HARQ_FEEDBACK, which indicates the HARQ feedback for the MAC PDU currently in the buffer. When the HARQ process is established, CURRENT_TX_NB may be initialized to 0.

The sequence of redundancy versions may be 0, 2, 3, and/or 1. A variable CURRENT_IRV may comprise an index into the sequence of redundancy versions. In an example implementation, this variable may be an up-dated modulo 4.

New transmissions may be performed on the resource and with the MCS indicated on (E)PDCCH or Random Access Response. Adaptive retransmissions may be performed on the resource and, if provided, with the MCS indicated on (E)PDCCH. Non-adaptive retransmission may be performed on the same resource and with the same MCS as was used for the last made transmission attempt.

An Uplink HARQ operation may be asynchronous for serving cells operating according to Frame Structure Type 3 (for example, LAA cells).

In a non-adaptive UL HARQ process, the MAC entity may be configured with a Maximum number of HARQ transmissions and a Maximum number of Msg3 HARQ transmissions by RRC: maxHARQ-Tx and maxHARQ-Msg3Tx respectively. For transmissions on HARQ processes and logical channels except for transmission of a MAC PDU stored in the Msg3 buffer, the maximum number of transmissions may be set to maxHARQ-Tx. For transmission of a MAC PDU stored in the Msg3 buffer, the maximum number of transmissions may be set to maxHARQ-Msg3 Tx.

In an example embodiment, a MAC entity may perform the following process. In a TTI, the HARQ entity may: identify the HARQ process(es) associated with the TTI, and for an identified HARQ process may perform the following process. If an uplink grant has been indicated for the process and the TTI: if the received grant was not addressed to a Temporary C-RNTI on (E)PDCCH and if the NDI provided in the associated HARQ information has been toggled compared to the value in the previous transmission of the HARQ process; or if the uplink grant was received on (E)PDCCH for the C-RNTI and the HARQ buffer of the identified process is empty; or if the uplink grant was received in a Random Access Response, the MAC may perform the following actions. If there is a MAC PDU in the Msg3 buffer and the uplink grant was received in a Random Access Response: obtain the MAC PDU to transmit from the Msg3 buffer. Else, obtain the MAC PDU to transmit from the "Multiplexing and assembly" entity; deliver the MAC PDU and the uplink grant and the HARQ information to the identified HARQ process; and instruct the identified HARQ process to trigger a new transmission. Otherwise, the MAC may perform the following: deliver the uplink grant and the HARQ information (redundancy version) to the identified HARQ process; and instruct the identified HARQ process to generate an adaptive retransmission.

If an uplink grant has not been indicated for the process and the TTI: if the HARQ buffer of this HARQ process is not empty: instruct the identified HARQ process to generate a non-adaptive retransmission.

When determining if NDI has been toggled compared to the value in the previous transmission, the MAC entity may ignore NDI received in an uplink grant on (E)PDCCH for its Temporary C-RNTI. In an example embodiment, the above process may be for a licensed cell.

In an example embodiment, when the HARQ feedback is received for this TB, the HARQ process in a MAC entity may: set HARQ_FEEDBACK to the received value.

If the HARQ entity requests a new transmission, the HARQ process may perform: et CURRENT_TX_NB to 0; set CURRENT_IRV to 0; store the MAC PDU in the associated HARQ buffer; store the uplink grant received from the HARQ entity; set HARQ_FEEDBACK to NACK; and/or generate a transmission as described below, and/or a combination of these tasks.

If the HARQ entity requests a retransmission, the HARQ process may: increment CURRENT_TX_NB by 1; if the HARQ entity requests an adaptive retransmission: store the uplink grant received from the HARQ entity; set CURRENT_IRV to the index corresponding to the redundancy version value provided in the HARQ information; set HARQ_FEEDBACK to NACK; generate a transmission as described below. Else, if the HARQ entity requests a non-adaptive retransmission: if HARQ_FEEDBACK=NACK: generate a transmission as described below.

When receiving a HARQ ACK alone, the MAC entity may keep the data in the HARQ buffer. When no UL-SCH transmission can be made due to the occurrence of a measurement gap, no HARQ feedback may be received and a non-adaptive retransmission may follow.

To generate a transmission, the HARQ process may: if the MAC PDU was obtained from the Msg3 buffer; or if there is no measurement gap at the time of the transmission and, in case of retransmission, the retransmission does not collide with a transmission for a MAC PDU obtained from the Msg3 buffer in the TTI: instruct the physical layer to generate a transmission according to the stored uplink grant with the redundancy version corresponding to the CURRENT_IRV value; increment CURRENT_IRV by 1; and if there is a measurement gap at the time of the HARQ feedback reception for this transmission and if the MAC PDU was not obtained from the Msg3 buffer: set HARQ_FEEDBACK to ACK at the time of the HARQ feedback reception for the transmission.

After performing the above actions, when a HARQ maximum number of transmissions is configured, the HARQ process may: if CURRENT_TX_NB=maximum number of transmissions−1, flush the HARQ buffer.

An asynchronous HARQ may be implemented for UL HARQ for an unlicensed cell. The scheduler at the eNB may schedule UL transmissions and retransmissions. Transmissions or retransmissions may be scheduled via (E)PDCCH. Implementation of mechanisms implemented in legacy uplink synchronous HARQ for unlicensed cells adopting an asynchronous HARQ may result in many issues. Example embodiments may enhance implementation of asynchronous uplink HARQ.

In an example embodiment, a wireless device may receive one or more radio resource control (RRC) messages comprising configuration parameters for a licensed assisted access (LAA) cell. The one or more RRC messages may comprise one or more consecutive uplink subframe allocation configuration parameters. In an example, the one or more consecutive uplink subframe allocation configuration parameters comprises a first field, N.

A wireless device may receive a downlink control information (DCI) indicating uplink resources in a number of one or more consecutive uplink subframes of the LAA cell. The DCI may comprise: the number of the one or more consecutive uplink subframes (m); an assignment of a plurality of resource blocks; and a transmit power control command. The first field may indicate an upper limit for the number of the one or more consecutive uplink subframes.

The wireless device may perform a listen before talk procedure indicating that a channel is clear for a starting subframe of the one or more consecutive uplink subframes. The wireless device may transmit one or more transport blocks, via the plurality of resource blocks used across the one or more consecutive uplink subframes. At least one field included in a multi-subframe DCI may determine transmission parameters and resource blocks used across m consecutive subframes for transmission of one or more TBs. The DCI may comprise an assignment of a plurality of resource blocks for uplink transmissions. The UE may use the RBs indicated in the DCI across m subframes. The same resource blocks may be allocated to the UE in m subframes.

A transmission power of the one or more transport blocks in each subframe of the one or more consecutive uplink subframes may employ the transmit power control (TPC) command in the multi-subframe DCI. A transmission power of the one or more transport blocks in each subframe of the one or more consecutive uplink subframes may be adjusted in each subframe when a total transmit power in each subframe exceeds a power value in each subframe. The power value may be an allowed maximum transmission power of the wireless device. A calculation of the transmission power may employ a measured pathloss value. The transmission power the one or more transport blocks in each subframe of the one or more consecutive uplink subframes may employ the same closed loop adjustment factor (calculated employing, at least, the TPC in multi-subframe DCI). The closed loop adjustment factor may be calculated employing the transmit power control command.

An UL grant for subframe n sent by an eNB, for example, on subframe n−4, may comprise a power control command from eNB for UE to adjust its uplink transmission power for transmission of a signal, for example, PUSCH, SRS, etc. on an uplink of an LAA SCell. A UE may calculate a transmit power considering a power control command received from the eNB Enhanced power control mechanisms may be implemented for uplink transmission when an eNB transmits a multi-subframe UL grant applicable to multiple subframes.

In an example embodiment, a UE may receive a multi-subframe uplink DCI grant comprising a TPC for one or more consecutive subframes starting from subframe n. The UE may calculate uplink transmit power for subframe n based on the TPC command and other power parameters as described in PUSCH/SRS power calculation mechanism. This may be considered a baseline power for transmission on subframes associated with the multi-subframe uplink grant. The UE may apply the same baseline power to subframes associated with the multi-subframe grant. For example, TPC command may be employed to calculate a closed loop adjustment factor (f(i)) for subframe i. The same closed loop adjustment factor may be employed for subframes in the one or more consecutive subframes associated with the multi-subframe uplink grant.

In an example, for subframe i in one or more consecutive subframes, f(n)=f(n−1)+TPC, when accumulation is enabled and where the TPC is the transmit power control received in the multi-subframe grant. f(n) may be calculated for subframe n (the starting subframe in the one or more subsequent subframes) and may be applied to all subframes in the one or more consecutive subframes. This implies that f(n)=f(n−1)+TPC for the starting subframe in the one or more consecutive subframes, and f(i)=f(i−1) for subsequent subframes, where i>n and subframe i is one of the subsequent subframes in the one or more consecutive subframes.

In an example, for subframe n in one or more consecutive subframes, f(n) may equal TPC when accumulation is not enabled and where the TPC comprises the transmit power control received in the multi-subframe grant. f(n) may be calculated for subframe n (the starting subframe in the one or more subsequent subframes) and may be applied to all subframes in the one or more consecutive subframes. This may imply that f(i)=TPC for each subframe i in the one or more consecutive subframes.

An example embodiment for a multi-subframe grant may reduce downlink control overhead by including one TPC field and one RB resource assignment field in a multi-subframe grant for multiple subframes. Example embodiments provide a flexible method for resource assignment and power calculations for multiple subframes. An example embodiment may reduce overhead control signaling for resource block assignment(s). An example embodiment reduces overhead control signaling for TPC transmission while maintaining flexibility for each subframe power calculation. Although one TPC field is transmitted in a multi-subframe DCI grant, power calculation(s) may be performed for each subframe separately. A wireless device may have different transmit power values for different subframes (of an LAA cell) associated with a multiple-subframe grant, while using the same TPC field. Calculating the same power value for multiple subframes may introduce unnecessary constraints which may reduce uplink transmission efficiency in some scenarios. Example embodiments may reduce downlink control overhead while providing flexibility for separate transmit power calculations for each subframe when needed.

The UE may adjust the UE signal transmit power when needed based on maximum allowed transmit power limitation of a UE in a subframe. For example, if multi-subframe grant is applicable to subframes n, n+1 and n+2, a UE may calculate a baseline power for the uplink transmission of PUSCH. In subframes n, n+1, and n+2, the UE may or may not adjust the transmit power depending on power limitations in the subframe. The UE may adjust (when needed) the transmit power in each subframe so that the total transmit power in each subframe is below a maximum allowed transmit power of the UE in each subframe. In the example illustrated in FIG. 13A, LAA PUSCH may be adjusted differently in each subframe due to power limitations in subframes n, n+1, and n+2. When a calculated total power exceeds a threshold in a subframe, the UE may adjust PUSCH transmit power in the subframe. The calculated power may be for licensed cell(s) and/or unlicensed cell(s). In the example illustrated in FIG. 13B, the power may not be adjusted due to power limitations and pathloss is the same across subframes. The UE may maintain the same transmit power for PUSCH transmission of the LAA cell across subframes.

In an example embodiment, a UE may calculate uplink transmit power for subframe n based on a TPC command in the UL grant and other power parameters as described in PUSCH power calculation mechanism. The UE may calculate uplink transmit power on subframe n+1 based on TPC comment on UL grant and other power parameters as described in PUSCH power calculation mechanism. The UE may employ the same closed loop adjustment factor ($f(i)$) as the baseline for all the subframes in the one or more subsequent subframes.

The UE may apply adjustments, if needed, to compensate for changes in measured pathloss reference (for example, using a configured moving average equation, or based on a measured value). The transmit power may be recalculated in a subframe when the pathloss has changed in the subframe. The UE may also adjust the UE signal transmit power, if needed, based on a maximum allowed transmit power limitation of a UE in each subframe. For example, if a multi-subframe grant is applicable for subframes n, n+1 and n+2, a UE may calculate a baseline power for the uplink transmission of PUSCH. In subframes n, n+1, and n+2, the UE may or may not adjust the transmit power depending on whether the pathloss reference measurement is changed. The UE may or may not adjust the transmit power depending on power limitations in the subframe. The UE may adjust (when needed) the transmit power in a subframe so that the total transmit power in a subframe is below a maximum allowed transmit power of the UE in the subframe.

In an example embodiment, one or more RRC messages configuring the LAA cell may indicate whether a single baseline power is calculated for subframes or whether each subframe may have its own calculated power (for example, based on pathloss reference value, etc.). Power adjustments due to UE maximum allowed power may be applicable to a subframe, when needed.

Uplink power control may control a transmit power of the different uplink physical channels. In an example, the setting of the UE Transmit power for a Physical Uplink Shared Channel (PUSCH) transmission may be defined as follows. If the UE transmits PUSCH without a simultaneous PUCCH for the serving cell c, then the UE transmit power $P_{PUSCH,c}(i)$ for PUSCH transmission in subframe i for the serving cell c may be given by $$P_{PUSCH,c}(i) = \min \begin{Bmatrix} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{Bmatrix}$$
[dBm]

If the UE transmits PUSCH simultaneous with PUCCH for the serving cell c, then the UE transmit power $P_{PUSCH,c}(i)$ for the PUSCH transmission in subframe i for the serving cell c may be given by $$P_{PUSCH,c}(i) = \min \begin{Bmatrix} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \alpha_c(j) \cdot PL_c + \Delta_{TF,c}(i) + f_c(i) \end{Bmatrix}$$
[dBm]

If the UE is not transmitting PUSCH for the serving cell c, for the accumulation of TPC command received with DCI format 3/3A for PUSCH, the UE may assume that the UE transmit power $P_{PUSCH,c}(i)$ for the PUSCH transmission in subframe i for the serving cell c is computed by $$P_{PUSCH,c}(i) = \min\{P_{CMAX,c}(i), P_{O\_PUSCH,c}(1) + \alpha_c(1) \cdot PL_c + f_c(i)\} [dBm]$$

where, $P_{CMAX,c}(i)$ may be a configured UE transmit power in subframe i for serving cell c and $\hat{P}_{CMAX,c}(i)$ may be the linear value of $P_{CMAX,c}(i)$. $\hat{P}_{PUCCH}(i)$ may be the linear value of $P_{PUCCH}(i)$. $M_{PUSCH,c}(i)$ may be the bandwidth of the PUSCH resource assignment expressed in number of resource blocks valid for subframe i and serving cell c. Further description of some of the parameters in a power control formula may be defined according to the latest LTE-Advanced standard specifications (for example, 3GPP TS 36.213). $PL_c$ may be the downlink path loss estimate calculated in the UE for serving cell c in dB.

$\delta_{PUSCH,c}$ may be a correction value, also referred to as a TPC command and may be included in PDCCH/EPDCCH with DCI format comprising a corresponding TPC. In an example, if the UE is configured with higher layer parameter UplinkPowerControlDedicated-v12x0 for serving cell c and if subframe i belongs to uplink power control subframe set 2 as indicated by the higher layer parameter tpc-Subframe-Set-r12, the current PUSCH power control adjustment state for serving cell c is given by $f_{c,2}(i)$, and the UE shall use $f_{c,2}(i)$ instead of $f_c(i)$ to determine $P_{PUSCH,c}(i)$. Otherwise, the current PUSCH power control adjustment state for serving cell c is given by $f_c(i)$. $f_{c,2}(i)$ and $f_c(i)$ may be defined by the following example formulas.

$f_c(i)=f_c(i-1)+\delta_{PUSCH,c}(i-K_{PUSCH})$ and $f_{c,2}(i)=f_{c,2}(i-1)+\delta_{PUSCH,c}(i-K_{PUSCH})$ if accumulation is enabled based on the parameter Accumulation-enabled provided by higher layers (for example, in RRC message), where $\delta_{PUSCH,c}(i-K_{PUSCH})$ may be signalled on PDCCH/EPDCCH with DCI format on subframe $i-K_{PUSCH}$, and where $f_c(0)$ is the first value after reset of accumulation. For example, the value of $K_{PUSCH}$ is for FDD or FDD-TDD and serving cell frame structure type 1, $K_{PUSCH}=4$. For a serving cell with frame structure type 3, subframe $i-K_{PUSCH}$ comprises the DCI comprising TPC for subframe i, based on uplink grant format and grant timing. $\delta_{PUSCH,c}=0$ dB for a subframe where no TPC command is decoded for serving cell c or where DRX occurs or i is not an uplink subframe in TDD or FDD-TDD and serving cell c frame structure type 2. In an example, $\delta_{PUSCH,c}=0$ dB if the subframe i is not the starting subframe scheduled by a PDCCH/EPDCCH of a multi-subframe uplink DCI grant. In an example, if UE has reached $P_{CMAX,c}(i)$ for serving cell c, positive TPC commands for serving cell c shall not be accumulated. In an example, if a UE has reached minimum power, negative TPC commands shall not be accumulated.

In an example embodiment, $f_c(i)=\delta_{PUSCH,c}(i-K_{PUSCH})$ and $f_{c,2}(i)=\delta_{PUSCH,c}(i-K_{PUSCH})$ if accumulation is not enabled for serving cell c based on the parameter Accumulation-enabled provided by higher layers (for example, RRC layer). $\delta_{PUSCH,c}(i-K_{PUSCH})$ is the TPC command received for subframe i.

In an example embodiment, if the UE is not configured with an SCG or a PUCCH-SCell, and if the total transmit power of the UE would exceed $\hat{P}_{CMAX}(i)$, the UE may scale $\hat{P}_{PUSCH,c}(i)$ for the serving cell c in subframe i such that the condition $$\sum_c w(i) \cdot \hat{P}_{PUSCH,c}(i) \leq (\hat{P}_{CMAX}(i) - \hat{P}_{PUCCH}(i))$$

is satisfied where $\hat{P}_{PUCCH}(i)$ may be the linear value of $P_{PUCCH}(i)$, $\hat{P}_{PUSCH,c}(i)$ may be the linear value of $P_{PUSCH,c}(i)$, $\hat{P}_{CMAX}(i)$ may be the linear value of the UE total configured maximum output power $P_{CMAX}$ in subframe i and w(i) may be a scaling factor of $\hat{P}_{PUSCH,c}(\ )$ for serving cell c where 0≤w(i)≤1. In case there is no PUCCH transmission in subframe i $\hat{P}_{PUCCH}(i)=0$.

If the UE is not configured with an SCG or a PUCCH-Scell, and if the UE has PUSCH transmission with UCI on serving cell j and PUSCH without UCI in any of the remaining serving cells, and the total transmit power of the UE would exceed $\hat{P}_{CMAX}(i)$, the UE may scale $P_{PUSCH,c}(i)$ for the serving cells without UCI in subframe i such that the condition $$\sum_{c \neq j} w(i) \cdot \hat{P}_{PUSCH,c}(i) \leq (\hat{P}_{CMAX}(i) - \hat{P}_{PUSCH,j}(i))$$

is satisfied where $\hat{P}_{PUSCH,j}(i)$ is the PUSCH transmit power for the cell with UCI and w(i) is a scaling factor of $\hat{P}_{PUSCH,c}(i)$ for serving cell c without UCI. In this case, no power scaling may be applied to $\hat{P}_{PUSCH,j}(i)$ unless $$\sum_{c \neq j} w(i) \cdot \hat{P}_{PUSCH,c}(i) = 0$$

and the total transmit power of the UE still would exceed $\hat{P}_{CMAX}(i)$.

For a UE not configured with a SCG or a PUCCH-SCell, note that w(i) values may be the same across serving cells when w(i)>0 but for certain serving cells w(i) may be zero. If the UE is not configured with an SCG or a PUCCH-SCell, and if the UE has simultaneous PUCCH and PUSCH transmission with UCI on serving cell j and PUSCH transmission without UCI in any of the remaining serving cells, and the total transmit power of the UE would exceed $\hat{P}_{CMAX}(i)$, the UE may obtain $\hat{P}_{PUSCH,c}(i)$ according to $$\hat{P}_{PUSCH,j}(i) = \min(\hat{P}_{PUSCH,j}(i), (\hat{P}_{CMAX}(i) - \hat{P}_{PUCCH}(i)))$$

and $$\sum_{c \neq j} w(i) \cdot \hat{P}_{PUSCH,c}(i) \leq (\hat{P}_{CMAX}(i) - \hat{P}_{PUCCH}(i) - \hat{P}_{PUSCH,j}(i))$$

In an example embodiment, if the UE is configured with a LAA SCell for uplink transmissions, the UE may compute the scaling factor w(i) assuming that the UE performs a PUSCH transmission on the LAA SCell in subframe i irrespective of whether the UE can access the LAA SCell for the PUSCH transmission in subframe i according to the channel access procedures.

A DCI indicating a multi-subframe grant (MSFG) may be supported in carrier aggregation, for example, for an unlicensed cell (e.g. an LAA cell). Design of a multi-subframe grant (MSFG) may take into account the design of existing DCIs used for single subframe grants. For example, current LTE-A DCI Format 0 and 4 may be used for uplink grants with and without special multiplexing. DCI Format 0 and 4 may be updated to support MSFGs with or without special multiplexing.

A MSFG may allow a UE to transmit on multiple consecutive uplink subframes based on some common set of transmission parameters. Some of transmission parameters, like MCS level, power control command, and/or resource assignments (e.g. RBs) may be common across scheduled subframes. Some parameters, like HARQ process ID, RV and/or NDI may be subframe specific. The DCI indicating a MSFG may comprise one or more parameters indicating the number of consecutive subframes allowed for transmission according to the grant. In an example, the parameters which may be configured by DCI may include the number of consecutive subframes (m) associated with the MSFG. A MSFG may provide resource allocation for subframes starting from subframe n and ending at subframe n+m−1.

In an example, a MSFG DCI may include two parts. One or more fields of a MSFG DCI may be included in a dedicated DCI and one or more fields of the MSFG DCI may be included in a common DCI. The dedicated DCI may be received on a UE specific search space of a control channel ((e)PDCCH). In an example, the same common DCI that is employed for DL LAA dynamic signaling (e.g. DCI including indication of partial/full end subframes) may also be employed for an uplink MSFG grant. An eNB may transmit the common DCI corresponding to a MSFG DCI on a common search space of PDCCH of the LAA cell.

There is a need to define UE behavior when an LBT for the starting subframe of the one or more consecutive subframes associated with a MSFG is not successful. The UE may implement subsequent LBT attempts if configured. There is a need to define data transmission mechanisms for when a UE's LBT is not successful for the starting subframe n in one or more m consecutive subframes: subframe n to n+m−1.

When a UE receives a multi-subframe grant (MSFG) for UL transmissions of m consecutive subframes on an LAA carrier, the UE may perform LBT before transmission on the scheduled subframes. A successful LBT may be followed by a reservation signal if transmission of the reservation signals is allowed and/or needed. The UE's LBT may or may not succeed before start of a first allowed transmission symbol of subframe n. In an example, if UE's LBT is successful before a first allowed transmission symbol of subframe n, the UE may transmit data according to multi-subframe DCI. The UE may transmit data (TBs) when LBT is successful.

The DCI indicating a MSFG may include parameters for UEs behavior due to LBT. A multi-subframe DCI may include possible LBT time interval(s) and/or at least one LBT configuration parameter. The DCI may indicate one or more configuration parameters for LBT process before transmissions corresponding to a MSFG.

In an example, one or more DCI may indicate configuration for transmission of reservation signals, format of reservation signals, allowed starting symbol, and/or LBT intervals/symbols associated with a MSFG. For example, the DCI may indicate a PUSCH starting position in a subframe. LBT procedure may be performed before the PUSCH starting position. One or more DCI may comprise configuration parameters indicating reservation signals and/or partial subframe configuration. In an example embodiment, transmission of reservation signals and/or partial subframe for a multi-subframe grant may not be supported.

In an example, a UE may perform LBT (e.g. in a symbol) before subframe n starts. In an example, a UE may perform LBT in a first symbol of subframe n. A UE may be configured to perform LBT in one or more allowed symbols of a subframe, or within a configured period/interval in a subframe. The multi-subframe grant DCI may include possible LBT time interval(s) and/or at least one LBT configuration parameter. For example, DCI may indicate that PUSCH starts in symbol 0 and a LBT procedure is performed before PUSCH starts (e.g. last symbol of a previous subframe). For example, DCI may indicate that PUSCH starts in symbol 1 and an LBT procedure is performed before PUSCH starts (e.g. in symbol 0).

In an example, one or more LBT configuration parameters may be indicated in an RRC message. In an example, one or more RRC message configuring an LAA cell may comprise at least one field indicating an LBT interval.

In an example embodiment, when a UE's LBT does not succeed for a transmission opportunity in a scheduled starting subframe n, the UE may perform LBT on the last symbol of subframe n or first symbol of subframe n+1 (e.g. depending on LBT configuration parameter in the DCI), to check if it can start transmission in subframe n+1. If the second LBT fails, the UE may repeat the LBT process for a next transmission opportunity. In an example, there may be one configured transmission opportunity per subframe. A UE may perform LBT process for m times and for m subframes. In an example, m may be signaled by an eNB through DCI in a MSFG. In an example, an RRC message configuring the LAA cell may include at least one LBT parameter. In an example, a multi-subframe DCI grant may indicate LBT parameters (e.g. parameter m, LBT symbol/PUSCH starting position) for MSFG.

Figure 12:
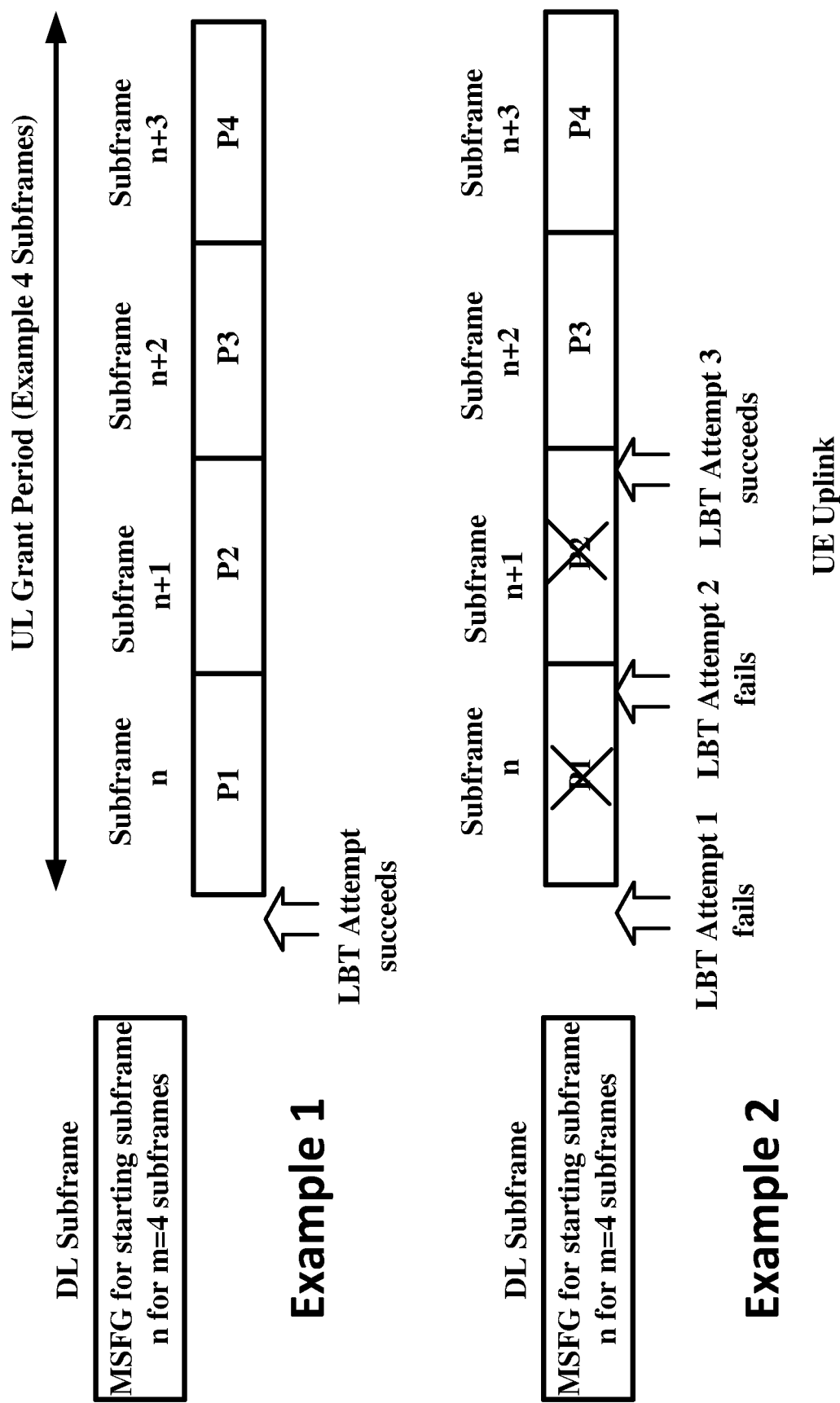
FIG. 12 is an example diagram depicting listen before talk procedures as per an aspect of an embodiment of the present disclosure.

FIG. 12 shows examples of MSFG and LBT processes when the number of scheduled subframes is 4 (for subframes n, n+1, n+2, and n+3). The UE receives MSFG and prepares packets (TBs) P1, P2, P3, and P4 for transmission in subframes n, n+1, n+2, and n+3, respectively. The one or more transport blocks prepared/stored for each subframe is associated with the HARQ process ID of the corresponding subframe.

In an example, if LBT succeeds for transmission on a subframe k>=n within scope of multi-subframe UL grant, the UE may transmit scheduled data packets on a first available subframe/partial-subframe and may follow with transmission of subsequent packets (TBs) based on uplink grant till end of a scheduled period, e.g. subframe n+3. An example in which the first LBT attempt is successful is illustrated in FIG. 12, Example 1.

In an example, LBT process for subframes n and n+1 may fail and LBT process for subframe n+2 may succeed. The UE may transmit packets P3 and P4 originally scheduled for subframe n+2 and n+3. The UE may not transmit packets P1 and P2 in subframes n and n+1 when LBT for subframes n and n+1 does not succeed. The UE may wait for eNB to reschedule packets P1 and P2. The eNB may transmit subsequent uplink grants to the UE for transmission of P1 and P2. This example is illustrated in FIG. 12, Example 2.

In an example, a wireless device may receive a DCI indicating uplink resources in a set of m consecutive subframes 0 to m−1. The DCI may comprise a first field indicating m; one or more second fields indicating one or more listen-before-talk (LBT) configurations. The DCI may further comprise a third field indicating timing information for performing LBT for a subframe. The wireless device may store one or more transport blocks corresponding to each subframe in the set of m consecutive subframes. TB(s) corresponding to a subframe are transmitted in the subframe if channel is available during the subframe. If the channel is not available in a subframe k, TB(s) corresponding to the subframe n are stored but are not transmitted. The UE may perform LBT for access to the channel in subframe k+1, and different TBs (different from TBs not transmitted in subframe n) corresponding to subframe k+1 are transmitted in subframe n+1, if the channel is available during the subframe k+1.

The wireless device may perform an LBT procedure on a channel to make a transmission in subframe k+1 according to the one or more LBT configurations and the timing information, if the wireless device cannot access the channel for a transmission in subframe k, k∈{0, . . . , m−2}. The wireless device may transmit one or more transport blocks corresponding to subframe k+1, if the LBT procedure indicates a clear channel. The wireless device has access to the channel in subframe k, if LBT procedure succeeds in subframe k. The wireless device has access to the channel in subframe k, if the wireless device makes a transmission in subframe k.

Example embodiments provide a dynamic and efficient method for LBT procedures when a MSFG is received. DCI associated with a MSFG enable dynamical control of LBT configuration and/or timing for a MSFG burst. The wireless device implements an LBT procedure and TB transmission process according to the MSFG. The wireless device may attempt an LBT for each subframe associated with MSFG until LBT is successful. Performing a limited number of LBT procedures in allowed configured intervals for subframes according to the DCI provides a dynamic and efficient mechanism for LBT procedure that reduces UE processing requirements and reduces UE power consumption. TBs are associated with a given subframe, and associated TB(s) to a subframe are transmitted if the channel is clear for transmission in the subframe. This mechanism enables both UE and eNB to associate a TB to the HARQ process corresponding the subframe. The eNB may not need to determine whether a TB is not received due to LBT failure or excessive interference. Example embodiments provide an improved process for LBT procedure and packet transmission when a MSFG is received from an eNB.

In an example embodiment, various configuration for transmission of reservation signals (e.g. format of reservation signals, allowed starting symbol, LBT intervals/symbols, etc.). One or more RRC messages may comprise configuration parameters indicating reservation signals and/or partial subframe configuration. One or more DCI may comprise configuration parameters indicating reservation signals and/or partial subframe configuration. In an example embodiment, transmission of reservation signals and/or partial subframe for a multi-subframe grant may not be supported.

In an example, a UE may be configured to transmit a reservation signal to reserve the channel when LBT is successful. In an example, a UE may not be configured to transmit a reservation signal to reserve the channel when LBT is successful.

A UE behavior in terms of above examples may be pre-defined, may be RRC configurable or may be dynamically configured by the eNB through one or more common or dedicated DCIs. Indication through DCI may provide an eNB with flexibility in both DL and UL scheduling of subframes on LAA carrier as it may dynamically control UE's use of uplink subframes given unpredictable outcome of LBT.

In an example embodiment, in deployment scenarios where loading is low or when presence of other technologies and/or uncoordinated LAA cells may be guaranteed common behavior may be expected for same UE across multiple grants and even across multiple UE's in which case RRC signaling may also be implemented.

The UE may consider COT limit and may stop transmission based on reaching COT limit. When an eNB provide a UE with a multi-subframe grant, the eNB may have information about the number of subframes the UE is allowed to transmit before it reaches its maximum channel occupancy time (COT). When an eNB schedules more subframes N than what UE is enable to transmit within its maximum COT, M, the UE may transmit one or more subframes based on the grant and may stop when the UE reaches its end of COT. The eNB may reschedule remaining scheduled but not transmitted UL allocations.

An eNB may transmit to a UE one or more RRC message comprising configuration parameters of a plurality of cells. The plurality of cells may comprise one or more licensed cell and one or more unlicensed (e.g. LAA) cells. The eNB may transmit one or more DCIs for one or more licensed cells and one or more DCIs for unlicensed (e.g. LAA) cells to schedule downlink and/or uplink TB transmissions on licensed/LAA cells.

Uplink Hybrid-ARQ design for licensed carriers in LTE-A may be synchronous, e.g. uplink retransmissions may occur at a priori pre-determined subframe relative to the previous transmission. In the case of FDD operation uplink retransmissions may occur eight subframes after the prior transmission attempt for the same hybrid-ARQ process. A mode of operation for UL HARQ may be non-adaptive where the set of resource blocks used for the retransmissions may be identical to the initial transmission. A hybrid-ARQ acknowledgement is transmitted on the PHICH. When a negative acknowledgement is received on the PHICH, the data is retransmitted with the same transmission parameters and resource blocks as previous transmission.

In an example, uplink HARQ may allow adaptive re-transmissions, where the resource-block set and/or modulation-and-coding scheme for retransmissions may be changed by an eNB through uplink grants for retransmissions. While non-adaptive retransmissions may be used due to a lower overhead, adaptive retransmissions may be useful to avoid or reduce fragmenting the uplink frequency resource or to avoid or reduce collisions with random-access resources.

In an example, for a licensed cell, DCI Format 0 and 4 may be used for uplink grants with and without special multiplexing, respectively. The uplink DCI grant may include one or more of the following fields: Flag for format0/format1A differentiation, Hopping flag, N_ULhop, Resource block assignment, MCS/RV, NDI (New Data Indicator), TPC for PUSCH, Cyclic shift for DM RS, UL index (TDD only), Downlink Assignment Index (DAI), CSI Request, SRS Request, and/or MIMO parameters, e.g. precoding information and/or the number of layers.

An eNB may transmit to a wireless device an uplink DCI grant. The uplink DCI grant may comprise a new-data indicator (NDI). The wireless device may flush a transmission buffer when an NDI is included in the DCI for adaptive and/or non-adaptive hybrid ARQ. The new-data indicator is toggled to indicate a transmission for at least one new transport block. If the new-data indicator is toggled, the terminal may flush the transmission buffer and transmit at least one new data packet (TB). When the new-data indicator is not toggled the previous transport block may be retransmitted with a requested redundancy version.

In a licensed cell, when a retransmission is scheduled by a DCI transmitted via a PDCCH, the eNB may indicate which redundancy version (RV) should be transmitted. In an example, uplink grants for retransmissions may use the same MCS format as the initial transmission MCS format. The uplink DCI grant may include a field that combines information on the RV indication and modulation-and-coding scheme (MCS). The uplink DCI grant may comprise an IMCS field (e.g. 5 bits) indicating an MCS for an initial transmission with an RV=0 or a re-transmission RV of e.g. 1, 2 or 3. The TB retransmission may use the same MCS format as the initial TB transmission (with RV=0) MCS format. In an example, the five-bit IMCS field can have 32 different binary combination values. 29 IMCS field values may be used to indicate MCS for an initial transmission, e.g. with RV=0. The three remaining IMCS field values may be used to indicate grants for RV=1, 2 and 3. The transport block size for RV=1, 2, 3 may be known from the initial transmission and may not change between retransmission attempts. Configuring a single field for both MCS and RV reduces the size of an uplink grant DCI. The reduced flexibility does not have a sizeable negative impact on a licensed cell uplink transmission performance and may actually simplify the HARQ encoding process. In an example, uplink DCI grant transmitted by an eNB may not comprise the HARQ process ID.

In an LAA cell, uplink transmissions may follow an asynchronous HARQ process. An eNB may schedule both transmissions and retransmissions. There may be no need for PHICH transmissions in the downlink. Uplink grants for LAA cells may provide a UE with parameters for asynchronous HARQ, and may include a HARQ process ID. In LAA cells, an eNB may provide UEs with uplink grants through self-scheduling or cross carrier scheduling.

In LAA SCells, an eNB may provide a UE with multi-subframe grants (MSFG). A multi-subframe grant (MSFG) may allow a UE to transmit on multiple subframes (MSFG burst) based on a common set of transmission parameters. Some of transmission parameters, like power control commands and MCS may be common across scheduled subframes while some parameters, like HARQ process ID, RV and NDI may be subframe specific.

An uplink MSFG burst may include multiple TBs of multiple HARQ processes. This may result in complexities in designing a MSFG DCI. A MSFG may include resource allocation information, MCS information, MIMO information, and/or HARQ related fields, along with other parameters. There is a need to provide an efficient design for DCI format for unlicensed cells, for example, MSFG DCI. The DCI format should provide flexibility for TB transmission of multiple HARQ processes, and should have a reduced DCI size.

In an example embodiment, an MSFG DCI may include information about RV, NDI and HARQ process ID of a subframe of the grant. For example, when a grant is form subframes, the grant may include at least m set of RVs and m set of NDIs for HARQ processes associated with m subframes in the grant. In an example, subframe specific parameters may comprise one or more of the following for each subframe of a MSFG burst: M bits for RV, example 2 bits for 4 redundancy versions; and/or 1 bit for NDI. An example of multiple uplink MSFG burst transmission and corresponding HARQ Process ID, RV, and NDI is shown in FIG. 14. In an example, a transport block may transmitted in multiple bursts with different RVs until the transport block is successfully decoded by the eNB. Each MSFG burst may have its own MCS indicated by a MSFG DCI. HARQ process identifier associated with a subframe may be incremented in subsequent subframes of a MSFG burst, for example, a burst with three subframes may be associated with HARQ process identifiers 1, 2, and 3.

In an example, a MSFG DCI grant may comprise common parameters comprising: TPC for PUSCH, Cyclic shift for DM RS, resource block assignment, MCS and/or spatial multiplexing parameters (if any, for example included in DCI format 4), LBT related parameters applied to the uplink burst, and/or Other parameters, e.g. one or more multi-subframe configuration parameters. These parameters may be the same for different subframes of a MSFG burst. Resource block assignment, MCS and/or spatial multiplexing parameters may change from one MSFG burst to another MSFG burst. An uplink MSFG DCI may further include, for example, a CSI (e.g. aperiodic) request and/or an SRS (e.g. aperiodic) Request.

In an example, different TBs transmitted with different RV values for a HARQ process may have different sizes. A first TB transmitted with RV=0 associated with a HARQ process may have resource block assignments, MCS and/or spatial multiplexing parameters of a first burst, a second TB transmitted with RV=1 associated with the same HARQ process may have a second resource block assignments, MCS and/or spatial multiplexing parameters of a second burst. Encoder in a transmitter may consider this into account when encoding the data to prepare different TBs for transmission to the eNB. Different HARQ TBs (e.g. with RV=0, 1, 2, . . . ) associated with a HARQ process may have different RB assignments, MCS, and MIMO parameters. There is a need to enhance DCI format for an LAA cell. The eNB may transmit to a UE an uplink DCI grant indicating uplink resources for an LAA cell. The DCI may comprise an MCS field (e.g. 5 bits) and at least one RV field (e.g. 2 bits).

In an example, an uplink DCI may employ 5 bit MCS field. The MCS field is encoded similar to I_MCS field for used in DCI format 0 and is interpreted the same was to decode the MCS level. The same MCS may be applied to multiple subframes of a MSFG burst. The DCI may use a separate 2 bit RV for each subframe associated with the MSFG. Example DCI fields for a licensed cell and unlicensed cell (e.g. LAA cell) is shown in FIG. 16.

Example embodiment, enhances DCI format for an LAA cell compared with a DCI for a licensed cell. Combining MCS and RV field in a DCI for a licensed cell reduces DCI size and downlink overhead while having no or minimal impact in uplink radio efficiency. Separating MCS and RV field for a DCI for an LAA cell provides additional flexibility needed for managing packet retransmissions in an LAA cell as described in the above paragraphs. In additional it reduces the grant size specially when MSFG is considered. MCS field is common for the subframes associated with a MSFG, but DCI includes m RV field, one for each subframe associated with the MSFG. The enhanced DCI format for an unlicensed (e.g. LAA) cell comprise a separate MCS field and RV fields and provides enhanced flexibility for scheduling, e.g., MSFG bursts on the LAA cell.

In an example embodiment, a wireless device receives a first DCI indicating first uplink resources of a licensed cell. The first DCI may comprise a first field indicating one of: an MCS for an initial transmission with a RV value of zero; or a re-transmission RV value (e.g. 1, 2, 3). The wireless device may receive a second DCI indicating second uplink resources of an LAA cell. The second DCI may comprise an MCS field and an RV field. The wireless device may transmit one or more first transport blocks (TBs) employing the first field to determine a first MCS and a first RV for the one or more first TBs. The wireless device may transmit one or more second TBs employing the MCS field to determine a second MCS and the RV field to determine a second RV value for the one or more second TBs.

In an example embodiment, the common and subframe specific parameters are identified and signaled to UEs. In one example, common and subframe specific parameters of MSFG are included in the same DCI. In an example, a new DCI format is defined to include both common transmission parameters and subframe specific parameters for multi-subframes and HARQ processes.

In an example, common parameters and subframe specific parameters may be transmitted in separate DCIs. A UE receiving a multi-subframe grant may receive one DCI including common parameters applicable to an uplink burst across subframes and a second DCI which may show HARQ parameters for each subframe. For example, a first RNTI may be employed for searching/decoding a common DCI and a second RNTI may be employed for searching/decoding a subframe specific DCI. In an example, RNTI for common DCI may be pre-specified, or may be configured by a RRC message comprising the RNTI. In an example, common DCI may be transmitted on common search space of the LAA Cell. In an example, RNTI for subframe specific DCI may be configured for a UE using MAC/RRC signaling. In an example, common parameters may be configured and transmitted through RRC Signaling and subframe specific parameters may be transmitted in a DCI.

A UE may receive at least one downlink control information (DCI) from an eNB indicating uplink resources in m subframes of a licensed assisted access (LAA) cell. In an example embodiment, an MSFG DCI may include information about RV, NDI and HARQ process ID of a subframe of the grant. For example, when a grant is for m subframes, the grant may include at least m set of RVs and NDIs for HARQ processes associated with m subframes in the grant. In an example, subframe specific parameters may comprise one or more of the following for each subframe of a MSFG burst: M bits for RV, example 2 bits for 4 redundancy versions; and/or 1 bit for NDI.

In an example, common parameters may include: TPC for PUSCH, Cyclic shift for DM RS, resource block assignment, MCS and/or spatial multiplexing parameters (if any, for example included in DCI format 4), LBT related parameters applied to the uplink burst, and/or Other parameters, e.g. one or more multi-subframe configuration parameters. The MSFG DCI may comprise an RB assignment field, an MCS field, an TPC field, an LBT field applicable to all the subframes associated with a MSFG. These parameters may be the same for different subframes of a MSFG burst. Resource block assignment, MCS and/or spatial multiplexing parameters may change from one MSFG burst to another MSFG burst.

In an example, a UE may perform an LBT procedure for transmission in the m subframes employing at least one LBT field in the MSFG DCI. The at least one LBT field may indicate at least one LBT configuration parameter, e.g., LBT type/category, LBT symbol and/or LBT priority class. The UE may transmit, in each of the m subframes, one or more transport blocks employing the RBs field and the MCS field across the m subframes and employing each RV field and each NDI field corresponding to each subframe in the m subframes. The transmission power of each of the one or more transport blocks in each subframe in the m subframes may employ a same closed loop adjustment factor and the TPC field. The transmission power of each of the one or more transport blocks in each subframe in the m subframes may be adjusted in each subframe when a total calculated transmit power for each subframe exceeds a power value in each subframe.

An UL grant for subframe n sent by an eNB, e.g. on subframe n−4, may include a power control command from eNB for UE to adjust its uplink transmission power for transmission of a signal, e.g. PUSCH, SRS, etc. on an uplink of an LAA SCell. A UE may calculate a transmit power considering a power control command received from the eNB. Enhanced power control mechanisms may be implemented for uplink transmission when an eNB transmits a multi-subframe UL grant applicable to multiple subframes.

Figure 13A:
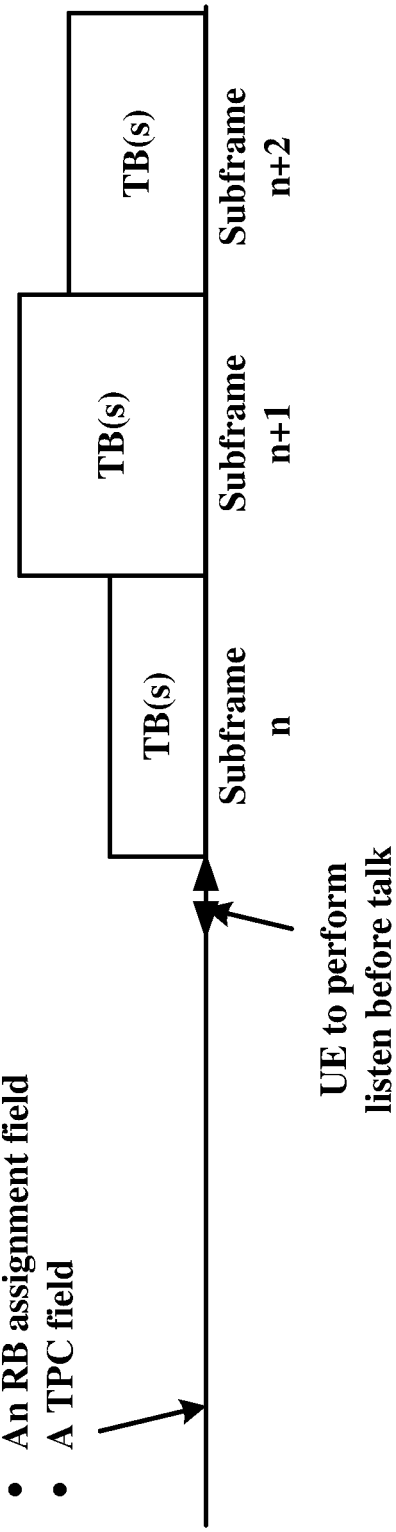
FIG. 13A and FIG. 13B are an example diagrams depicting a plurality of cells as per an aspect of an embodiment of the present disclosure.
Figure 13B:
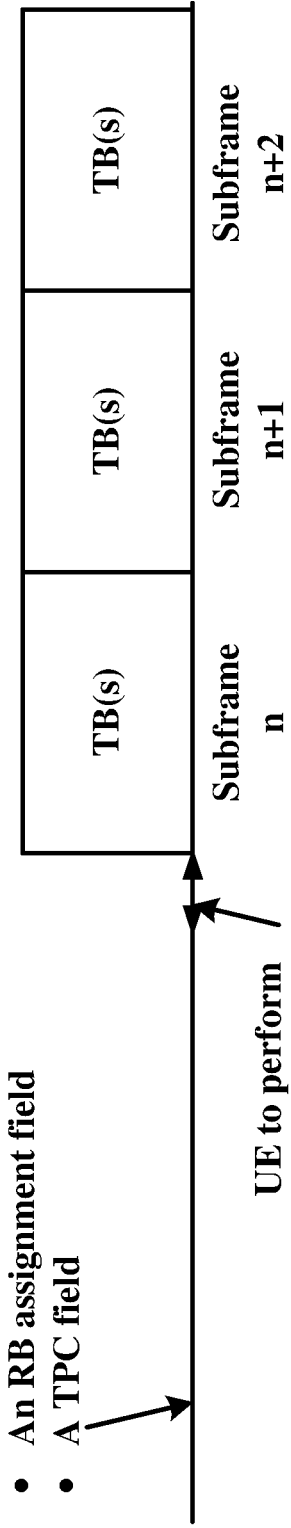

In an example embodiment, a UE may calculate uplink transmit power for subframe n based on a TPC command in the UL grant and other power parameters as described in PUSCH power calculation mechanism. The same TPC command and closed loop adjustment factor may be considered for different subframes of a MSFG burst. The UE may calculate uplink transmit power on subframes of a burst based on a common TPC command on UL grant and other power parameters as described in PUSCH power calculation mechanism. The UE may apply adjustments when needed to compensate for changes in measured pathloss reference (e.g. using a configured moving average equation, or based on a measured value). The transmit power may be calculated for a subframe considering a pathloss changed in a subframe. The UE may consider MCS, MIMO parameters, and/RB assignments for a given subframe for calculation of power for the subframe in a burst. The UE may also adjust the UE signal transmit power if needed based on maximum allowed transmit power limitations of a UE in a subframe. In addition, a UE may or may not adjust the transmit power depending on power limitations in the subframe. The UE may adjust (when needed) the transmit power in a subframe so that the total transmit power in a subframe is below a maximum allowed transmit power of the UE in the subframe. Two examples are shown in FIG. 13A and FIG. 13B. Example embodiment reduces the size of the DCI, enhances power calculations for uplink transmissions in a MSFG burst and/or enables subframe by subframe power adjustments when a MSFG burst is transmitted.

In an example embodiment, one or more RRC messages configuring the LAA cell may indicate whether a single baseline power is calculated for subframes or each subframe may have its own calculated power (e.g. based on pathloss reference value, etc.). Power adjustments due to UE maximum allowed power may be applicable to a subframe, when needed.

According to various embodiments, a device such as, for example, a wireless device, a base station and/or the like, may comprise one or more processors and memory. The memory may store instructions that, when executed by the one or more processors, cause the device to perform a series of actions. Embodiments of example actions are illustrated in the accompanying figures and specification.

Figure 17:
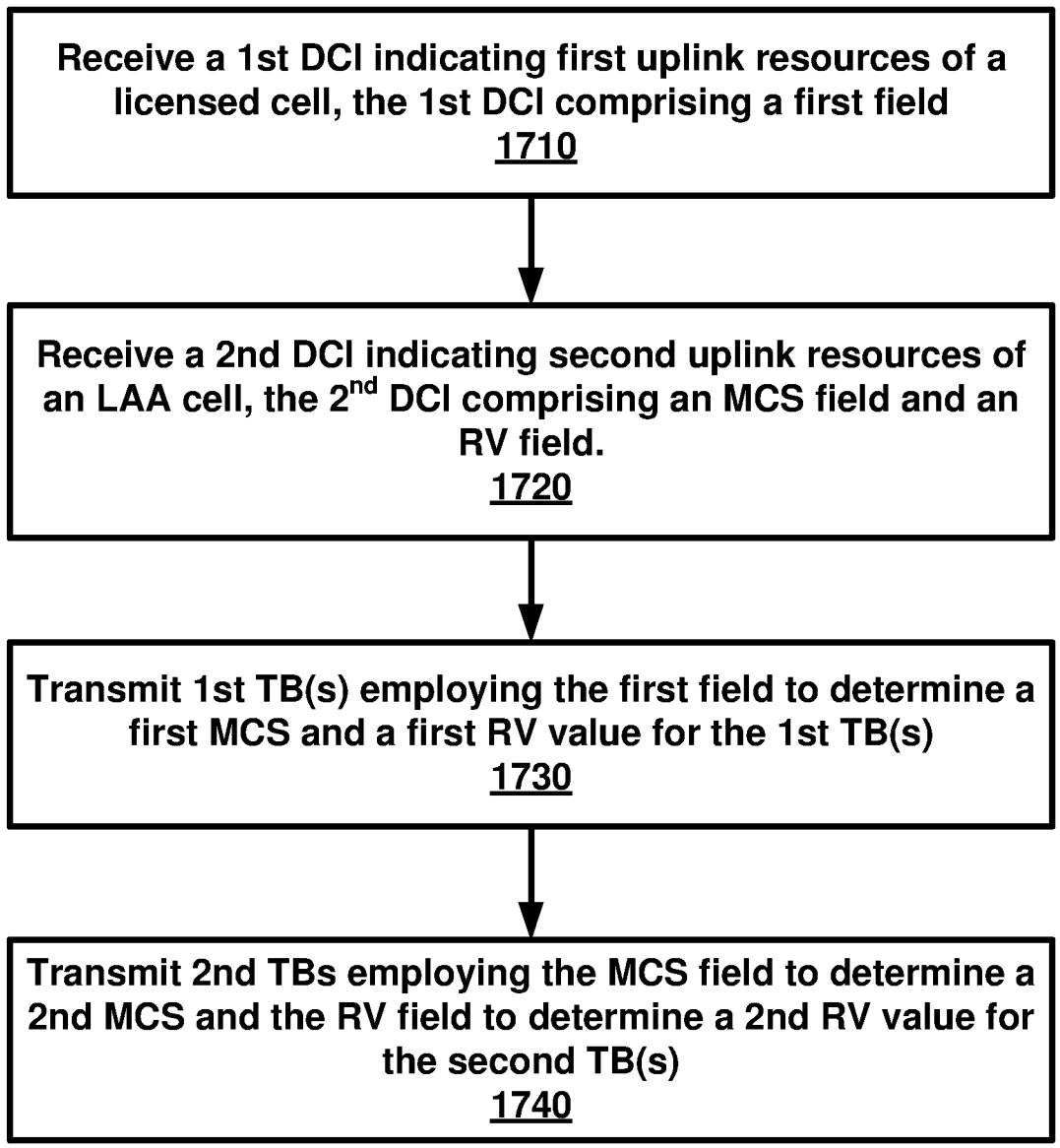
FIG. 17 is an example flow diagram illustrating an aspect of an embodiment of the present disclosure.

FIG. 17 is an example flow diagram as per an aspect of an embodiment of the present disclosure. At 1710, a wireless device may receive a first downlink control information (DCI) indicating first uplink resources of a licensed cell. The first DCI may comprise a first field indicating one of: a modulation and coding scheme (MCS) for an initial transmission with a redundancy version of zero, or a re-transmission redundancy version (RV) value. A second DCI indicating second uplink resources of a licensed-assisted-access cell may be received at 1720. The second DCI may comprise an MCS field and an RV field. At 1730, the wireless device may transmit one or more first transport blocks (TBs) employing the first field to determine a first MCS and a first RV value for the one or more first TBs. At 1740, the wireless device may transmit one or more second TBs employing the MCS field to determine a second MCS and the RV field to determine a second RV value for the one or more second TBs.

According to an embodiment, the first field may be encoded by five bits, the MCS field may be encoded by five bits, a table may be employed to determine the first MCS using the first field, and the table may be employed to determine the second MCS using the second MCS field. The re-transmission RV may, for example, have one of the following values: one, two or three. The RV field may, for example, have one of the following values: zero, one, two, or three. According to an embodiment, the first DCI may not comprise a HARQ process ID, and the second DCI may comprise a HARQ process ID. The second DCI may further comprise, for example, a listen before talk (LBT) field employed for performing an LBT procedure before transmitting the one or more second TBs. The second DCI may further comprise, for example, a resource blocks (RBs) field employed for transmitting the one or more second TBs. The second DCI may further comprise, for example, a new data indicators (NDI) field employed for transmitting the one or more second TBs.

Figure 18:
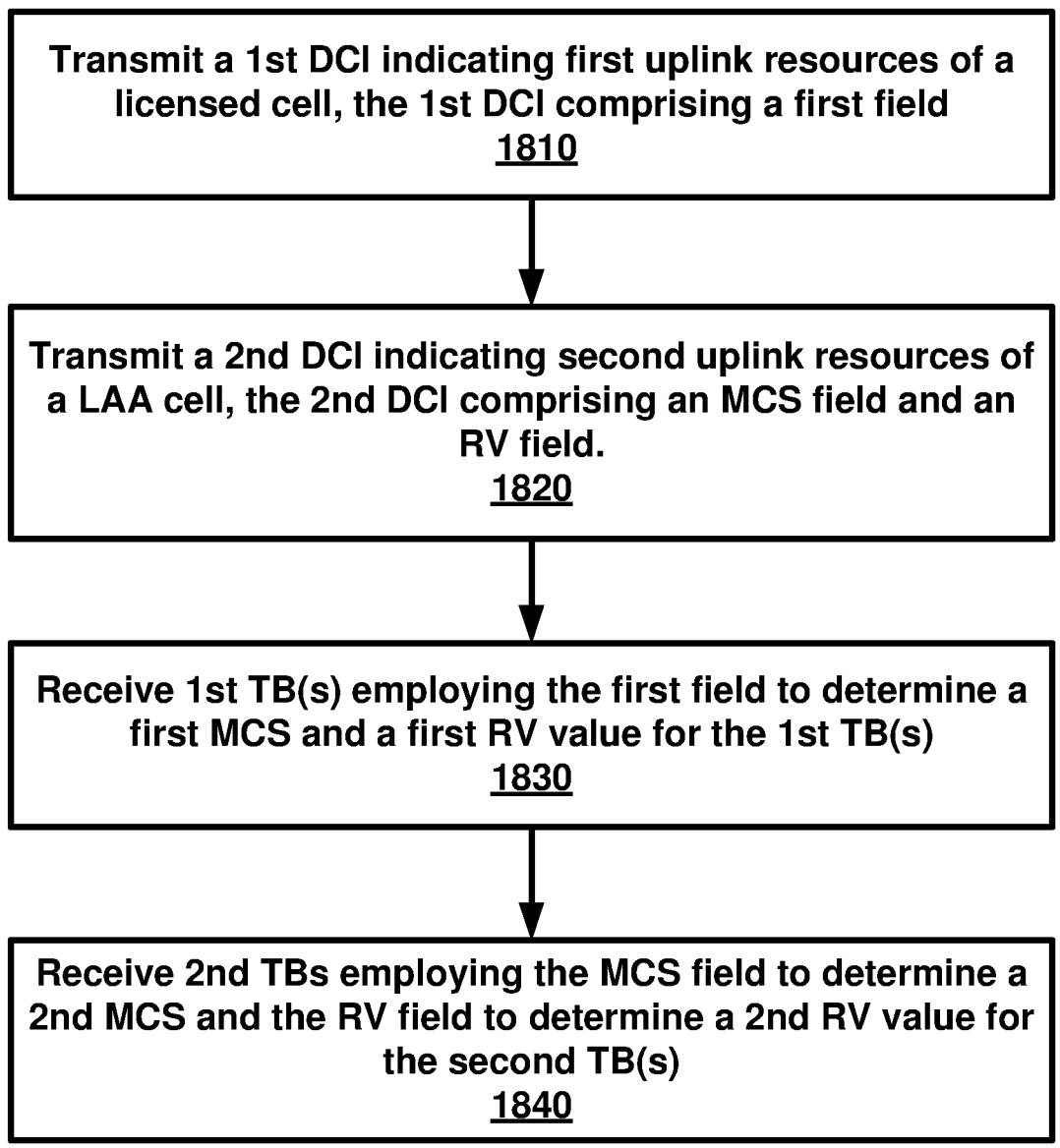
FIG. 18 is an example flow diagram illustrating an aspect of an embodiment of the present disclosure.

FIG. 18 is an example flow diagram as per an aspect of an embodiment of the present disclosure. At 1810, a base station may transmit a first downlink control information (DCI) indicating first uplink resources of a licensed cell. The first DCI may comprise a first field indicating one of: a modulation and coding scheme (MCS) for an initial transmission with a redundancy version of zero, or a re-transmission redundancy version (RV) value. A second DCI indicating second uplink resources of a licensed-assisted-access cell may be transmitted at 1820. The second DCI may comprise an MCS field and an RV field. At 1830, the base station may receive one or more first transport blocks (TBs) employing the first field to determine a first MCS and a first RV value for the one or more first TBs. At 1840, the base station may receive one or more second TBs employing the MCS field to determine a second MCS and the RV field to determine a second RV value for the one or more second TBs. According to an embodiment, the first field may be encoded is encoded by five bits, the MCS field may be encoded by five bits, a table may be employed to determine the first MCS using the first field, and the table may be employed to determine the second MCS using the second MCS field. The re-transmission RV may, for example, have one of the following values: one, two or three. The RV field may, for example, have one of the following values: zero, one, two, or three.

Figure 19:
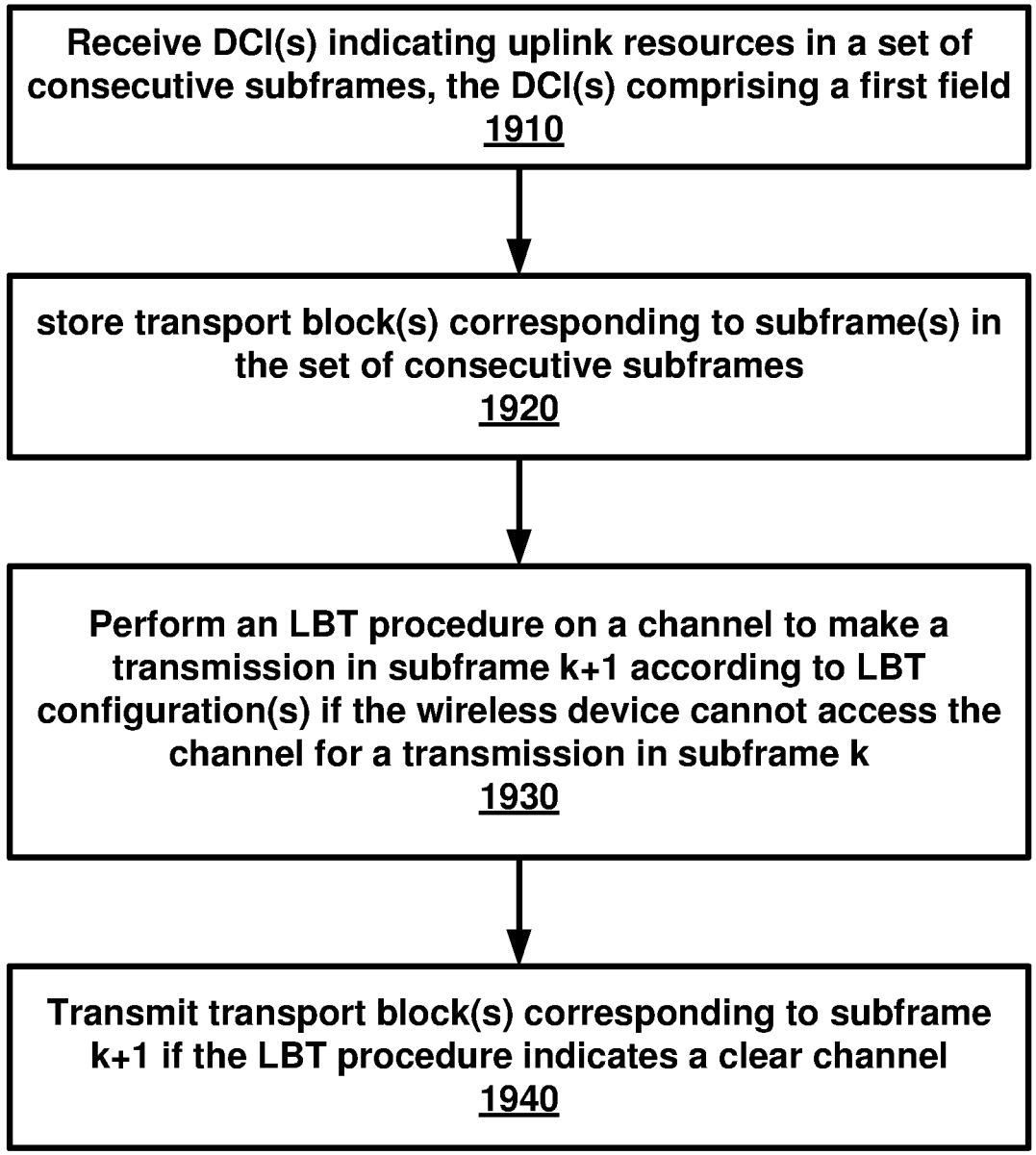
FIG. 19 is an example flow diagram illustrating an aspect of an embodiment of the present disclosure.

FIG. 19 is an example flow diagram as per an aspect of an embodiment of the present disclosure. At 1910, a wireless device may receive at least one downlink control information (DCI) indicating uplink resources in a set of m consecutive subframes 0 to m−1. The at least one DCI may comprise: a first field indicating m, one or more second fields indicating one or more listen-before-talk (LBT) configurations. The DCI may further comprise a third field indicating timing information for performing an LBT procedure for a subframe. At 1920, the wireless device may store one or more transport blocks corresponding to each subframe in the set of m consecutive subframes. At 1930, the wireless device may perform the LBT procedure on a channel to make a transmission in subframe k+1 according to the one or more LBT configurations and the timing information if the wireless device cannot access the channel for a transmission in subframe k, k∈{0, . . . ,m−2}. At 1940, the wireless device may transmit the one or more transport blocks corresponding to subframe k+1 if the LBT procedure indicates a clear channel.

The wireless device may have access to the channel in subframe k if, for example, the LBT procedure succeeds in subframe k. The wireless device may have access to the channel in subframe k if, for example, the wireless device makes a transmission in subframe k. According to an embodiment, the receiving the at least one DCI may comprise: receiving a first DCI via a wireless device specific search space of a first control channel, and receiving a second DCI via a common search space of a second control channel. The at least one DCI may indicate, for example: a modulation and coding scheme (MCS), a power control command, and a resource block assignment applicable to each subframe in the set of m consecutive subframes. Each subframe in the set of m consecutive subframes may be, for example, associated with a HARQ process identifier, a redundancy version (RV) and a new data indicator (NDI). The one or more transport blocks stored for each subframe may be, for example, associated with a HARQ process ID corresponding to the subframe. The third field may indicate, for example, that the LBT procedure for subframe k is performed in a first symbol of subframe k or a last symbol of subframe k−1. The at least one DCI may indicate, for example, an allowed starting position for transmission in the subframe. The one or more LBT configurations may indicate, for example, at least one of an LBT type or an LBT priority class.

Figure 20:
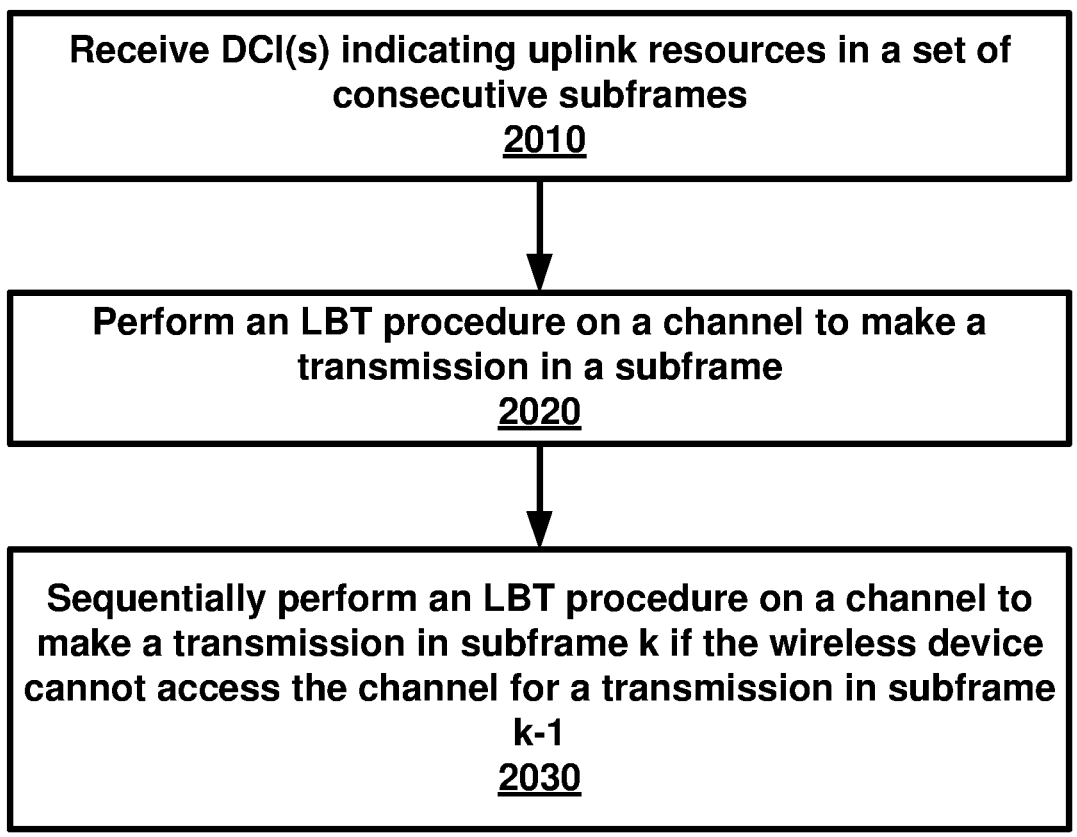
FIG. 20 is an example flow diagram illustrating an aspect of an embodiment of the present disclosure.

FIG. 20 is an example flow diagram as per an aspect of an embodiment of the present disclosure. At 2010, a wireless device may receive at least one downlink control information (DCI) indicating uplink resources in a set of m consecutive subframes 0 to m−1. The at least one DCI may comprise: a first field indicating m, one or more second fields indicating one or more listen-before-talk (LBT) configurations. The DCI may further comprise a third field indicating timing information for performing an LBT procedure for a subframe. At 2020, the wireless device may perform the LBT procedure on a channel to make a transmission in subframe k+1. At 2030, the wireless device may sequentially, for k∈{1, . . . ,m−1}, perform the LBT procedure on the channel to make a transmission in subframe k, if the wireless device cannot access the channel for a transmission in subframe k−1. The LBT procedure may be performed, for example, according to the one or more LBT configurations and/or the timing information.

Figure 21:
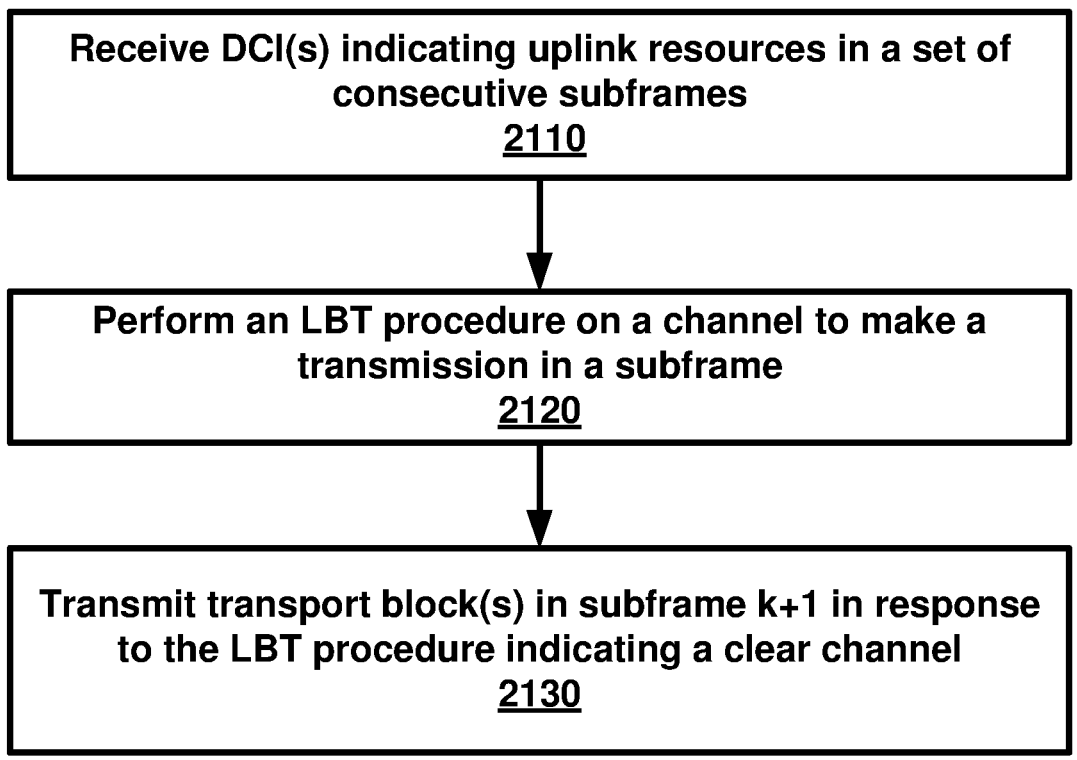
FIG. 21 is an example flow diagram illustrating an aspect of an embodiment of the present disclosure.

FIG. 21 is an example flow diagram as per an aspect of an embodiment of the present disclosure. At 2110, a wireless device may receive at least one DCI indicating uplink resources in a set of m consecutive subframes 0 to m−1. The at least one DCI may comprise: a first field indicating w. The at least one DCI may further comprise a third field indicating timing information for performing a listen-before-talk (LBT) procedure for a subframe. At 2120, the wireless device may perform the LBT procedure on a channel to make a transmission in subframe k+1 if the wireless device cannot access the channel for a transmission in subframe k, k∈{0, . . . ,m−2}. The wireless device may perform the LBT procedure according to the timing information. At 2140, the wireless device may transmit one or more transport blocks in subframe k+1 in response to the LBT procedure indicating a clear channel.

Figure 22:
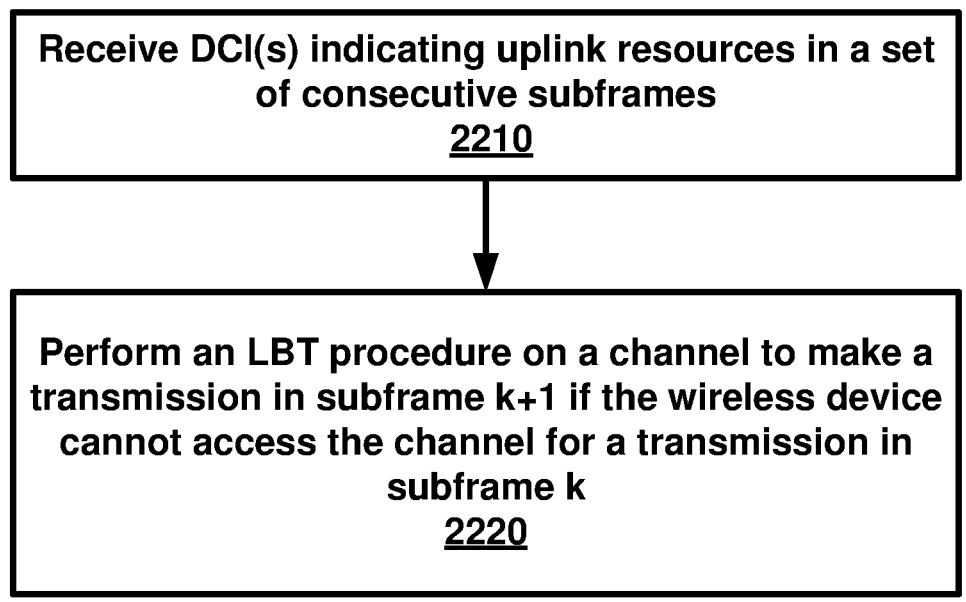
FIG. 22 is an example flow diagram illustrating an aspect of an embodiment of the present disclosure.

FIG. 22 is an example flow diagram as per an aspect of an embodiment of the present disclosure. At 2210, a wireless device may receive at least one DCI indicating uplink resources in a set of m consecutive subframes 0 to m−1. At 2120, the wireless device may perform a LBT procedure on a channel to make a transmission in subframe k+1 if the wireless device cannot access the channel for a transmission in subframe k, k∈{0, . . . ,m−2}.

Figure 23:
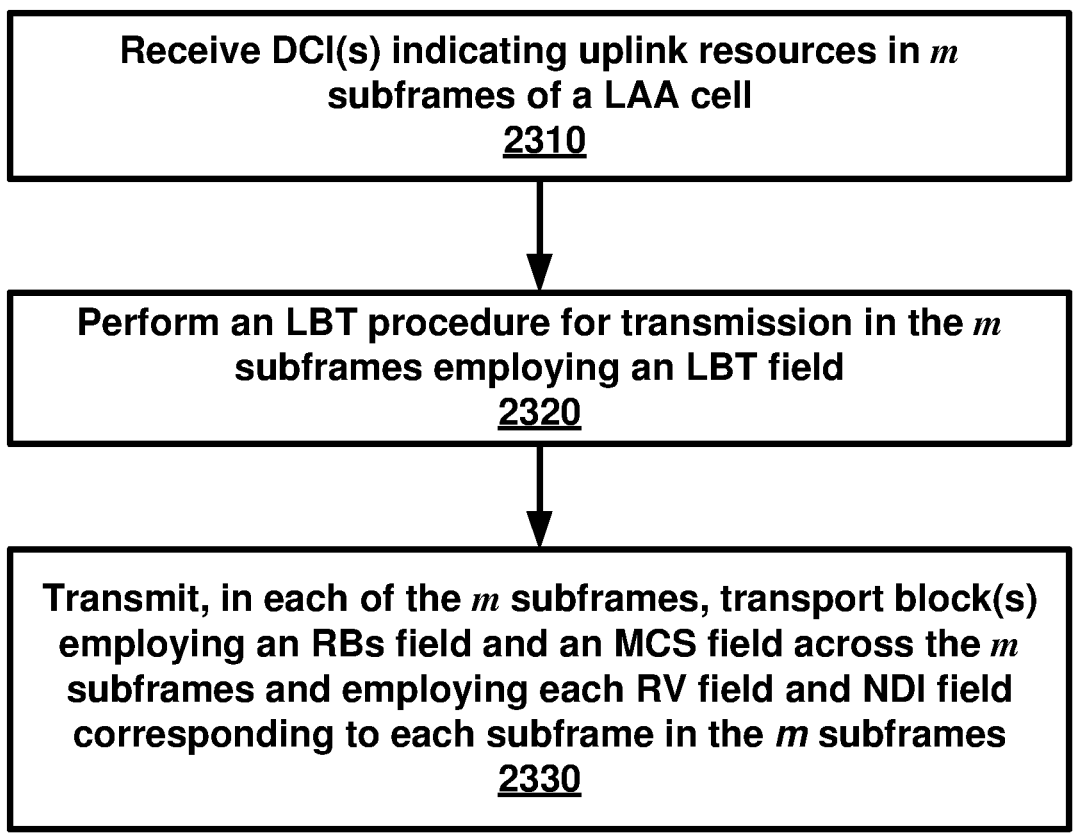
FIG. 23 is an example flow diagram illustrating an aspect of an embodiment of the present disclosure.

FIG. 23 is an example flow diagram as per an aspect of an embodiment of the present disclosure. At 2310, a wireless device may receive a first downlink control information (DCI) indicating first uplink resources in m subframes of a licensed assisted access (LAA) cell. The at least one DCI may comprise: a resource blocks (RBs) field, a modulation and coding scheme (MCS) field, a transmit power control (TPC) field, a listen before talk (LBT) field, a redundancy versions (RV) field for each of the m subframes, and a new data indicators (NDI) field for each of the m subframes. At 2320, the wireless device may perform an LBT procedure for transmission in the m subframes employing the LBT field. At 2330, the wireless device may transmit, in each of the m subframes, one or more transport blocks employing the RBs field and the MCS field across the m subframes and employing each RV field and each NDI field corresponding to each subframe in the m subframes. A transmission power of each of the one or more transport blocks in each subframe in the m subframes: may employ a same closed loop adjustment factor and the TPC field, and may be adjusted in each subframe when a total calculated transmit power for each subframe exceeds a power value in each subframe.

The transmission power of each of the one or more transport blocks may be calculated for each subframe, for example, based on a pathloss value for each subframe. According to an embodiment, the receiving the at least one DC may comprise: receiving a first DCI via a wireless device specific search space of a first control channel, and receiving a second DCI via a common search space of a second control channel of the LAA cell. The at least one DCI may comprise, for example, a cyclic shift field applicable to the m subframes. The cyclic shift may be employed for transmitting a demodulation reference signal. The at least one DCI may comprise, for example, a hybrid automatic repeat request (HARQ) identifier. A calculation of the transmission power may employ, for example, a measured pathloss value. A calculation of the adjustment factor may employ, for example, a transmit power control command. The LBT procedure may indicate, for example, that the channel is clear when a detected channel energy is below a threshold. Each subframe in the m subframe may be associated with, for example, a different HARQ process identifier. The LBT field may indicate, for example, at least one LBT configuration parameter.

According to an embodiment, the at least one DCI may further comprise a transmit power control (TPC) field. The transmission power of each of the one or more transport blocks in each subframe in the m subframes: may, for example, employ a same closed loop adjustment factor and the TPC field; and be adjusted in each subframe when a total calculated transmit power for each subframe exceeds a power value in each subframe.

Figure 24:
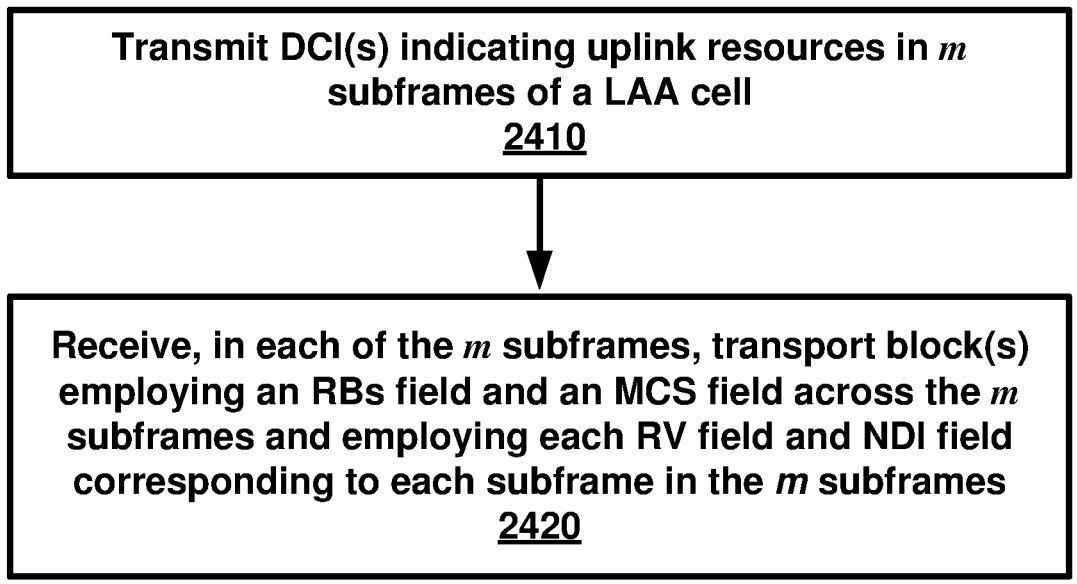
FIG. 24 is an example flow diagram illustrating an aspect of an embodiment of the present disclosure.

FIG. 24 is an example flow diagram as per an aspect of an embodiment of the present disclosure. At 2410, a base station may transmit a first downlink control information (DCI) indicating first uplink resources in m subframes of a licensed assisted access (LAA) cell. The at least one DCI may comprise: a resource blocks (RBs) field, a modulation and coding scheme (MCS) field, a listen before talk (LBT)

field, a redundancy versions (RV) field for each of the m subframes, and a new data indicators (NDI) field for each of the m subframes. At 2420, the base station may transmit, in each of the m subframes, one or more transport blocks employing the RBs field and the MCS field across the m subframes and employing each RV field and each NDI field corresponding to each subframe in the m subframes. According to an embodiment, an LBT procedure performed by a wireless device for transmission in the m subframes employing the LBT field indicates a clear channel.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e. hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using FDD communication systems. However, one skilled in the art will recognize that embodiments of the disclosure may also be implemented in a system comprising one or more TDD cells (e.g. frame structure 2 and/or frame structure 3-licensed assisted access). The disclosed methods and systems may be implemented in wireless or wireline systems. The features of various embodiments presented in this disclosure may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

The invention claimed is:

1. A method performed by a wireless device, the method comprising:
receiving downlink control information (DCI) for an uplink transmission;
identifying whether the DCI corresponds to first DCI for the uplink transmission via a licensed cell or second DCI for the uplink transmission via an unlicensed cell, wherein the first DCI comprises a first field used for determining a first modulation and coding scheme (MCS) with a first redundancy version (RV), the first field having a size of five bits, and wherein the second DCI comprises a second field used for determining a second MCS, a third field used for determining a second RV and a fourth field used for determining a transmit power, the second field having a size of five bits and the third field having a size of two bits;

based on an identification that the DCI corresponds to the first DCI, transmitting, via the licensed cell, a first transport block based on the first MCS and the first RV; and based on an identification that the DCI corresponds to the second DCI, transmitting, via a physical uplink shared channel of the unlicensed cell, a second transport block based on the second MCS, the second RV, and the transmit power.

2. The method of claim 1,
wherein a table is employed to determine the first MCS based on the first field, and
wherein the table is employed to determine the second MCS based on the second field.

3. The method of claim 1, wherein the first RV has one of the following values: zero, one, two or three.

4. The method of claim 1, wherein the third field has one of the following values: zero, one, two, or three.

5. The method of claim 1,
wherein the first DCI does not comprise a hybrid automatic repeat request (HARQ) process ID, and
wherein the second DCI comprises a HARQ process ID.

6. The method of claim 1, wherein the second DCI further comprises a fifth field employed for performing a listen before talk (LBT) procedure before transmitting the second transport block.

7. The method of claim 1, wherein the second DCI further comprises a sixth field associated with resource blocks for transmitting the second transport block.

8. The method of claim 1, wherein the second DCI further comprises a seventh field associated with new data indicator (NDI) for transmitting the second transport block.

9. A wireless device comprising:
one or more processors; and
memory storing instructions that, when executed by the one or more processors, cause the wireless device to:
receive downlink control information (DCI) for an uplink transmission,
identify whether the DCI corresponds to first DCI for the uplink transmission via a licensed cell or second DCI for the uplink transmission via an unlicensed cell, wherein the first DCI comprises a first field used for determining a first modulation and coding scheme (MCS) with a first redundancy version (RV), the first field having a size of five bits, and wherein the second DCI comprises a second field used for determining a second MCS, a third field used for determining a second RV and a fourth field used for determining a transmit power, the second field having a size of five bits and the third field having a size of two bits, based on an identification that the DCI corresponds to the first DCI, transmit, via the licensed cell, a first transport block based on the first MCS and the first RV, and based on an identification that the DCI corresponds to the second DCI, transmit, via a physical uplink shared channel of the unlicensed cell, a second transport block based on the second MCS, the second RV and the transmit power.

10. The wireless device of claim 9,
wherein a table is employed to determine the first MCS based on the first field, and
wherein the table is employed to determine the second MCS based on the second field.

11. The wireless device of claim 9, wherein the first RV has one of the following values: zero, one, two or three.

12. The wireless device of claim 9, wherein the third field has one of the following values: zero, one, two, or three.

13. The wireless device of claim 9,
wherein the first DCI does not comprise a hybrid automatic repeat request (HARQ) process ID, and
wherein the second DCI comprises a HARQ process ID.

14. The wireless device of claim 9, wherein the second DCI further comprises a fifth field employed for performing a listen before talk (LBT) procedure before transmitting the second transport block.

15. The wireless device of claim 9, wherein the second DCI further comprises a sixth field associated with resource blocks for transmitting the second transport block.

16. The wireless device of claim 9, wherein the second DCI further comprises a seventh field associated with new data indicator (NDI) for transmitting the second transport block.

\* \* \* \* \*